(12) United States Patent
Casbolt

(10) Patent No.: US 12,472,202 B2
(45) Date of Patent: Nov. 18, 2025

(54) COMPOSITIONS AND THEIR USE IN THE TREATMENT OF ENDOMETRIOSIS AND PAIN

(71) Applicant: RR Medsciences PTY LTD, Gordon (AU)

(72) Inventor: Llewellyn Stephen Frank Casbolt, Gordon (AU)

(73) Assignee: RR Medsciences PTY, LTD, Gordon (AU)

( * ) Notice: Subject to any disclaimer, the term of this patent is extended or adjusted under 35 U.S.C. 154(b) by 0 days.

(21) Appl. No.: 16/968,696

(22) PCT Filed: Feb. 9, 2019

(86) PCT No.: PCT/AU2019/050103
§ 371 (c)(1),
(2) Date: Aug. 10, 2020

(87) PCT Pub. No.: WO2019/153051
PCT Pub. Date: Aug. 15, 2019

(65) Prior Publication Data
US 2021/0015848 A1   Jan. 21, 2021

(30) Foreign Application Priority Data
Feb. 9, 2018 (AU) .................................. 2018900412

(51) Int. Cl.
*A61K 31/728* (2006.01)
*A61K 31/485* (2006.01)
*A61K 33/34* (2006.01)
*A61K 47/18* (2017.01)
*A61P 29/00* (2006.01)

(52) U.S. Cl.
CPC ............. *A61K 31/728* (2013.01); *A61K 33/34* (2013.01); *A61K 47/183* (2013.01); *A61P 29/00* (2018.01); *A61K 31/485* (2013.01)

(58) Field of Classification Search
CPC ........ A61P 15/00; A61P 29/00; A61K 31/728; A61K 33/34
See application file for complete search history.

(56) References Cited

U.S. PATENT DOCUMENTS

2018/0305378 A1* 10/2018 Casbolt .................. A61P 35/00

FOREIGN PATENT DOCUMENTS

| AU | 2004205086 A1 * | 3/2006 | ........... C07C 229/76 |
|---|---|---|---|
| CA | 2478137 A1 | 2/2006 | |
| WO | WO 2016/201524 A1 | 12/2016 | |

OTHER PUBLICATIONS

Barbucci (Journal of Inorganic Biochemistry; vol. 81, Issue 4; 2000; 229-337; abstract).*
Ialenti (Agents Actions; 43; 44-47; 1994).*
Stein (Frontiers in Pharmacology, 2013, vol. 4; Article 123; 1-3).*
ACTRN12617000206325, Trial Review, ANZCTR, date reistered Feb. 8, 2017, URL: https://www.anzctr.org.au/trial/registration/trialreview.aspx?id=372291, 6 pages.
Analgesic, Wikipedia, URL: https://en.wikipedia.org/wiki/Analgesic published on Nov. 6, 2017 as per Wayback Machine, 22 pages.
Banken et al., Final Evidence Report-Abuse-deterrent Formulations of Opioids: Effectiveness and Value. Institute for Clinical and Economic Review. 2017. 210 pages.
Curatolo et al., Drug combinations in pain treatment: a review of the published evidence and a method for finding the optimal combination. Best Pract Res Clin Anaesthesiol. Dec. 2002;16(4):507-19.
Eijkelkamp et al., Losing touch with opioids: New insights into a chemokine signaling cascade controlling morphine analgesia. Brain Behav Immun. May 2014;38:36-7.
Endometriosis, Wikipedia, URL: https://en.wikipedia.org/wiki/endometriosis published on Feb. 6, 2018 as per Wayback Machine, 26 pages.
Lin et al., CXCL12/CXCR4 Signaling Contributes to the Pathogenesis of Opioid Tolerance: A Translational Study. Anesth Analg. Mar. 2017;124(3):972-979.
Melik-Parsadaniantz et al., Opioid and chemokine receptor crosstalk: a promising target for pain therapy? Nat Rev Neurosci. Feb. 2015;16(2):69-78.
Remington: The Science and Practice of Pharmacy, 21st Ed., Lippincott Williams & Wilkins. 2005. TOC only. 14 pages.
Siquara De Sousa et al., Neural involvement in endometriosis: Review of anatomic distribution and mechanisms. Clin Anat. Nov. 2015;28(8):1029-38.

* cited by examiner

*Primary Examiner* — Pancham Bakshi
(74) *Attorney, Agent, or Firm* — David W. Staple; Casimir Jones, S.C.

(57) ABSTRACT

Disclosed are compositions useful in the treatment or prevention of endometriosis and pain. Also disclosed are methods for the treatment and/or prevention of endometriosis and pain.

8 Claims, 1 Drawing Sheet

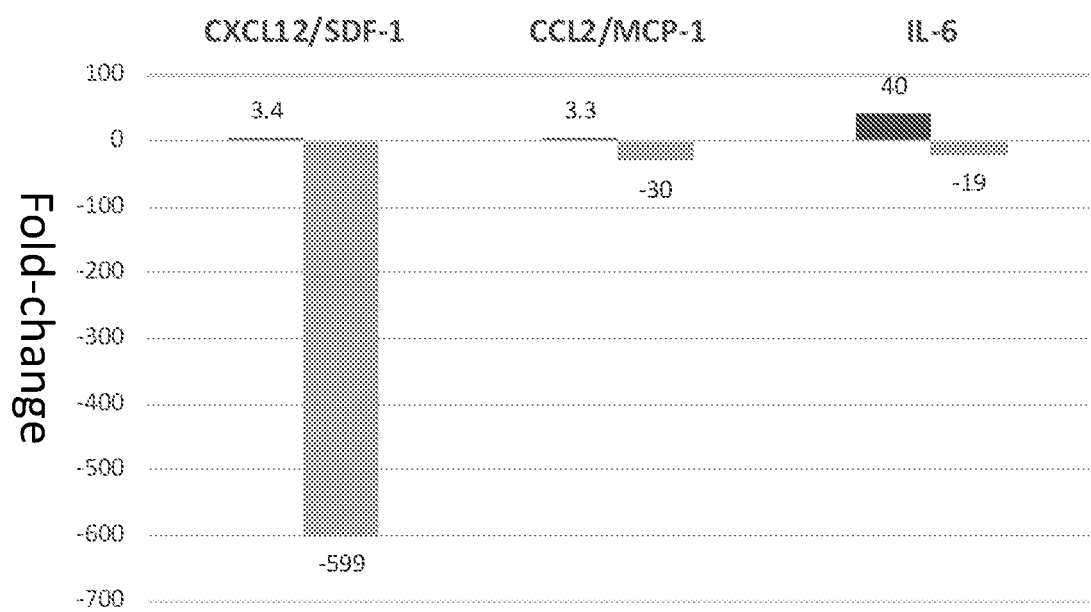

COMPOSITIONS AND THEIR USE IN THE TREATMENT OF ENDOMETRIOSIS AND PAIN

FIELD OF THE INVENTION

The present invention relates to compositions useful in the treatment or prevention of endometriosis and pain. The present invention also relates to the treatment or prevention of endometriosis and pain.

BACKGROUND OF THE INVENTION

It is to be understood that, if any prior art publication is referred to herein, such reference does not constitute an admission that the publication forms a part of the common general knowledge in the art, in Australia or any other country.

The endometrium normally responds to the sex hormones oestrogen and progesterone. In women with endometriosis, the misplaced endometrial cells also respond to these hormones. During ovulation, endometrial cells, including the misplaced endometrial cells, thicken. Unlike the endometrium, the misplaced endometrial cells cannot leave the body via menstruation. These cells bleed, causing an inflammatory response and pain. These cells eventually heal, but over time, this process can create scar tissue.

The causes of endometriosis remain unknown. However, some research suggests a number of possible causes and risk factors, including retrograde menstruation (also known as "backward menstruation"), abnormal immune response and genetics. In retrograde menstruation, menstrual fluid (containing endometrial tissue) flows backwards through the open-ended fallopian tubes into the pelvic cavity instead of leaving the body through the vagina. It is suspected that the endometrial tissue contained in this menstrual fluid can then adhere to structures it comes into contact with (e.g., ovaries) and the cells begin to grow. One theory suggests endometriosis develops in some women due to the immune system failing to control or stop the growth of endometrial tissue outside the uterus. Other theories suggest inheritance may play a role in the development of endometriosis; women have a higher risk of developing endometriosis if their mother and/or sister(s) are also affected. It is therefore suspected that certain genes predispose women to develop the disease.

Although endometriosis is associated with inflammation and immunological dysfunctions, it has not been proven itself to be an autoimmune disease.

It has also been reported that some environmental pollutants (e.g., dioxin, PCBs etc.) may contribute to the development of endometriosis and/or the exacerbation of its symptoms.

The symptoms associated with endometriosis include pain (including painful periods, painful ovulation, chronic pelvic pain and pain during or after sexual intercourse), heavy bleeding, fatigue, and infertility. In more severe cases of endometriosis, the pain can be debilitating. Endometriosis, and the symptoms thereof, can impact general physical, mental, and social wellbeing.

Endometriosis affects an estimated 1 in 10 women during their reproductive years (i.e., usually between the ages of 15 to 49), roughly equating to approximately 176 million women throughout the world. In an Australian government report, endometriosis is reported to cost Australian society $7.7 billion annually with two thirds of these costs attributed to loss in productivity with the remainder, approximately $2.5 billion, being direct healthcare costs.

Although endometriosis may be treated with medication, medications are not always effective and most medications are not suitable for long-term use. Surgery may be effective to remove misplaced endometrial tissue, endometriosis lesions and scar tissue, but success rates are dependent on the extent of disease and the surgeon's skills. Pregnancy may relieve some symptoms, but is not a "cure" for the disease. Hysterectomy, with simultaneous surgical removal of misplaced endometrial tissue, may relieve symptoms, but is also not a "cure" for the disease. Removal of the ovaries (usually at the same time as a hysterectomy is performed) increases the chances of pain relief but also results in an immediate onset of menopause.

There is therefore a need to provide alternative treatment options for those suffering from endometriosis and the pain associated with endometriosis. There is also a need to provide alternative treatment options for those suffereing with pain that is not associated with endometriosis.

The opioid crisis in the United States has recently been declared a 'public health emergency'. Here are some disturbing statistics published in 2016 by the US CDC:

Nearly 500,000 people died from drug overdoses in the United States between 2000 to 2014;

78 Americans die every day from an opioid overdose—including prescription opioids and heroin;

249 million opioid prescriptions were written in 2013 alone—enough for every adult American to have a bottle of pills;

More than half of the US opioid market is used for chronic, non-cancer related pain.

The trends in these statistics are now being reported in most western nations, although the United States has seen the most alarming growth of opiate related deaths of any countries over recent years.

In an environment where the incidence of chronic pain has grown to the point where 1 in 5 people are reported to be suffering from severe ongoing pain, the use of opiates at such levels is not a surprise. In the United States alone, it is reported that 100 million people have pain issues every year, with 9-12% of these people experiencing chronic pain, defined as pain which lasts more than 3 months (see, Benken, *Instit. Clin. Eco. Rev.,* 2017).

Opiates remain a first-line therapy for the treatment of moderate to severe acute and chronic pain, and under medical supervision are considered safe and effective for a high percentage of recipients. However, their addictive and euphoria inducing "dark side" put patients at risk of abuse, misuse, addiction and even death. And long-term use for chronic pain can lead to opiate tolerance, where diminishing pain relief is observed by patients, who then require regular increases in doses to maintain meaningful pain relief.

SUMMARY OF THE INVENTION

In one aspect, the present invention provides a composition comprising:
(i) hyaluronic acid, a salt of a hyaluronic acid or a mixture thereof; and
(ii) a copper ion complex or a mixture of copper ion complexes obtained by a process comprising:
(a) contacting copper having a specific surface area of from about 0.1 m$^2$/kg to about 2 m$^2$/kg, or in the form of particles having a bulk density of between about 0.2 and about 8.0 g/cm$^3$, with a chelating agent in solid form; and (b) while the copper is in contact with the chelating agent, contacting the copper and chelating agent with an oxidising agent, to form the copper ion complex or mixture of copper ion complexes.

In another aspect, the present invention provides a composition comprising:
(i) hyaluronic acid, a salt of a hyaluronic acid or a mixture thereof; and
(ii) a copper ion complex or a mixture of copper ion complexes comprising copper coordinated to a ligand of Formula (I) or Formula (II) or Formula (VI)

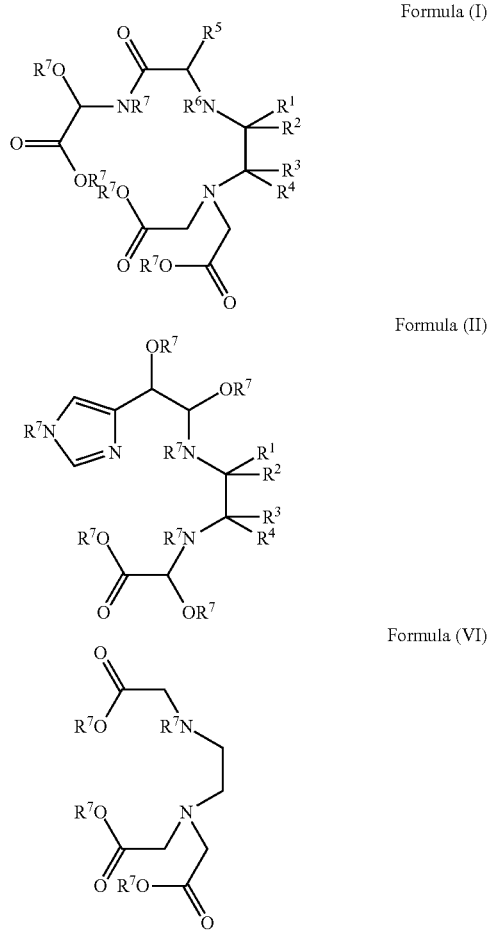

Formula (I)

Formula (II)

Formula (VI)

wherein
$R^1$ is H and $R^2$ is H or OH, or $R^1$ and $R^2$ together with the carbon atom to which they are attached form a carbonyl (C=O);
$R^3$ is H and $R^4$ is H or OH, or $R^3$ and $R^4$ together with the carbon atom to which they are attached form a carbonyl (C=O);
$R^5$ is —CH(OR$^7$)CH$_2$OR$^7$ or —CH$_2$CO$_2$R$^7$ and $R^6$ is absent or H, or $R^5$ is H and $R^6$ is —CH(OR$^7$)CH$_2$OR$^7$ or —CH$_2$CO$_2$R$^7$; and
each $R^7$ is independently absent or H;
or a salt thereof, tautomer thereof or polymer thereof.

Compositions according to the first or second aspect of the present invention may be collectively referred to herein as "compositions of the present invention" or a "composition of the present invention" or similar.

The compositions of the present invention find particular, though not exclusive, use in the treatment of endometriosis and pain, and will primarily be described in this context. Accordingly, the compositions of the present invention may, in some embodiments, be useful in the treatment or prevention of endometriosis. In some embodiments, the compositions of the present invention may be useful in the treatment or prevention of pain associated with endometriosis. In some embodiments, the compositions of the present invention may be useful in the treatment or prevention of pain that is not associated with endometriosis (e.g., pain due to peripheral nerve damage and pain related to the central nervous system).

The composition of the present invention comprises, in addition to hyaluronic acid, a salt of a hyaluronic acid or a mixture thereof, a copper ion complex or a mixture of copper ion complexes as referred to in the second aspect of the present invention, or obtained by the process referred to in the first aspect of the present invention. Such a copper ion complex or mixture of copper ion complexes are referred to herein as the "copper ion complex or mixture of copper ion complexes of the present disclosure" or similar. Unless stated otherwise, it is intended that a reference to "copper ion complex" or "mixture of copper ion complexes" and the like is intended to refer to the copper ion complex or mixture of copper ion complexes referred to in the first or second aspects of the present invention.

In yet another aspect, the present invention provides a method of treating or preventing endometriosis in a subject, the method comprising administering a composition according to the first or second aspect to the subject.

In still yet another aspect, the present invention provides a method of treating or preventing one or more symptoms of endometriosis in a subject, the method comprising administering a composition according to the first or second aspect to the subject.

In some embodiments, a symptom of endometriosis that is treated or prevented by the method is pain associated with endometriosis.

In another aspect, the present invention provides a method of treating or preventing pain in a subject, the method comprising administering a composition according to the first or second aspect to the subject.

In some embodiments, the pain is pain due to peripheral nerve damage. In some embodiments, the pain is pain related to the central nervous system. In some embodiments, the pain is pain associated with endometriosis. In some embodiments, the pain is dental pain.

In the methods according to the third, fourth and fifth aspects, the composition according to the first or second aspect of the present invention is typically formulated for topical administration and is typically administered topically.

In yet other aspects, the present invention provides the use of the components:
(i) hyaluronic acid, a salt of a hyaluronic acid or a mixture thereof; and
(ii) a copper ion complex or mixture of copper ion complexes of the present disclosure,
in the manufacture of a medicament for one or more of:
(a) the treatment of endometriosis,
(b) the prevention of endometriosis,
(c) the treatment of one or more symptoms of endometriosis,
(d) the prevention of one or more symptoms of endometriosis,
(e) the treatment of pain, and
(f) the prevention of pain.

In some embodiments, a symptom of endometriosis is pain associated with endometriosis.

In some embodiments, the pain is one or more of nociceptive pain, neuropathic pain, inflammatory pain, or a complex regional pain syndrome.

In some embodiments, the pain is pain due to peripheral nerve damage. In some embodiments, the pain is pain related to the central nervous system. In some embodiments, the pain is pain associated with endometriosis. In some embodiments, the pain is dental pain.

In a ninth, tenth and eleventh aspect, the present invention provides use of a composition comprising:
- (i) hyaluronic acid, a salt of a hyaluronic acid or a mixture thereof; and
- (ii) a copper ion complex or mixture of copper ion complexes of the present disclosure, in one or more of:
- (a) the treatment of endometriosis,
- (b) the prevention of endometriosis,
- (c) the treatment of one or more symptoms of endometriosis,
- (d) the prevention of one or more symptoms of endometriosis,
- (e) the treatment of pain, and
- (f) the prevention of pain.

In some embodiments, a symptom of endometriosis is pain associated with endometriosis.

In some embodiments, the pain is one or more of nociceptive pain, neuropathic pain, inflammatory pain, or a complex regional pain syndrome.

In some embodiments, the pain is pain due to peripheral nerve damage. In other embodiments, the pain is pain related to the central nervous system. In other embodiments, the pain is pain associated with endometriosis. In some embodiments, the pain is dental pain.

In yet another aspect, the present invention provides compositions comprising:
- (i) a copper ion complex or a mixture of copper ion complexes obtained by a process comprising:
  - (a) contacting copper having a specific surface area of from about 0.1 m²/kg to about 2 m²/kg, or in the form of particles having a bulk density of between about 0.2 and about 8.0 g/cm³, with a chelating agent in solid form; and
  - (b) while the copper is in contact with the chelating agent, contacting the copper and chelating agent with an oxidising agent, to form the copper ion complex or mixture of copper ion complexes;

and
- (ii) an opioid.

In some embodiments, the amount of opioid in the composition is less than a therapeutically effective dose, when administered individually.

In some embodiments, the opioid is selected from the group comprising: morphine, heroin, etorphine, hydromorphone, oxymorphone, levorphanol, codeine, hydrocodone, oxycodone, nalmefene, nalorphine, naloxone, naltrexone, buprenorphine, butorphanol, nalbuphine, methylnaltrexone, fentanyl, and methadone.

24. A composition according to any one of claims 21 to 23, wherein the opioid is morphine.

23. A kit comprising:
- (i) a copper ion complex or a mixture of copper ion complexes obtained by a process comprising:
  - (a) contacting copper having a specific surface area of from about 0.1 m²/kg to about 2 m²/kg, or in the form of particles having a bulk density of between about 0.2 and about 8.0 g/cm³, with a chelating agent in solid form; and
  - (b) while the copper is in contact with the chelating agent, contacting the copper and chelating agent with an oxidising agent, to form the copper ion complex or mixture of copper ion complexes;

and
- (ii) an opioid.

In some embodiments, the opioid is selected from the group comprising: morphine, heroin, etorphine, hydromorphone, oxymorphone, levorphanol, codeine, hydrocodone, oxycodone, nalmefene, nalorphine, naloxone, naltrexone, buprenorphine, butorphanol, nalbuphine, methylnaltrexone, fentanyl, and methadone. In some particular embodiments, the opioid is morphine.

In yet another aspect, the present invention provides methods of treating or preventing pain in a subject, the method comprising co-administering to the subject (i) a composition according to any one of claims 1 to 4, and (ii) an opioid, to thereby treat or prevent the pain in the subject.

Such methods of this aspect are particularly advantageous for treating pain in subjects that have opioid tolerance or are developing opioid tolerance. The methods also have utility in the treatment of pain in subjects who do not have opioid tolerance, but are at risk at developing opioid tolerance (e.g., have been prescribed opioids for the treatment of pain).

In some embodiments, the opioid is selected from the group comprising: morphine, heroin, etorphine, hydromorphone, oxymorphone, levorphanol, codeine, hydrocodone, oxycodone, nalmefene, nalorphine, naloxone, naltrexone, buprenorphine, butorphanol, nalbuphine, methylnaltrexone, fentanyl, and methadone.

In some embodiments of this type, the dose of the opioid is reduced over the duration of a treatment regimen.

DESCRIPTION OF THE FIGURES

An example of the present invention will now be described with reference to the accompanying drawings, in which:

FIG. 1 is a graphical representation of the fold-changes in the cytokines CXCL12, CCL2, and IL-6, in response to either opioid treatment (black boxes) or RM191A treatment (grey boxes) in primary fibroblasts in subjects with opioid analgesia dysregulation.

DETAILED DESCRIPTION OF THE INVENTION

The following description of the embodiments of the invention is not intended to limit the invention to these embodiments, but rather to enable any person skilled in the art to make and use this invention.

1. Definitions

Unless defined otherwise, all technical and scientific terms used herein have the same meaning as commonly understood by those of ordinary skill in the art to which the invention belongs. Although any methods and materials similar or equivalent to those described herein can be used in the practice or testing of the present invention, preferred methods and materials are described. For the purposes of the present invention, the following terms are defined below.

The articles "a" and "an" are used herein to refer to one or to more than one (i.e., to at least one) of the grammatical object of the article. By way of example, "a sample" means one sample or more than one sample.

The use of numerical values in the various ranges specified in this application, unless expressly indicated otherwise, are stated as approximations as though the minimum and maximum values within the stated ranges were both preceded by the word "about." In this manner, slight variations above and below the stated ranges (e.g., less than or equal to 10%, 9%, 8%, 7%, 6%, 5%, 4%, 3%, 2%, 1%) can be used to achieve substantially the same results as values within the ranges. Also, the disclosure of these ranges is intended as a continuous range including every value between the minimum and maximum values. In embodiments in which the stated range defines the position of an amino acid residue, for example, at the beginning or end of a domain, the present invention encompasses the defined position as well as slight variations (e.g., 1, 2, 3, 4, 5, 6, 7, 8, 9, 10, 11, 12, 13, 14, 15, 16, 17, 18, 19 or 20 amino acids) upstream or downstream of that position.

The terms "administration concurrently," "administering concurrently" or "co-administering" and the like refer to the administration of a single composition containing two or more actives, or the administration of each active as separate compositions and and/or delivered by separate routes either contemporaneously or simultaneously or sequentially within a short enough period of time that the effective result is equivalent to that obtained when all such actives are administered as a single composition. By "simultaneously" is meant that the active agents are administered at substantially the same time, and desirably together in the same formulation. By "contemporaneously" it is meant that the active agents are administered closely in time e.g., one agent is administered within from about one minute to within about one day before or after another. Any contemporaneous time is useful. However, it will often be the case that when not administered simultaneously, the agents will be administered within about one minute to within about eight hours and preferably within less than about one to about four hours. When administered contemporaneously, the agents are suitably administered at the same site on the subject, or at different sites on the subject (for example, administration to both left arm and right arm). The term "same site" includes the exact location, but can be within about 0.5 to about 15 centimeters, preferable from within about 0.5 to about 5 centimeters. The term "separately" as used herein means that the agents are administered at an interval, for example at an interval of about a day to several weeks or months. The active agents may be administered in either order. The term "sequentially" as used herein means that the agents are administered in sequence, for example at an interval or intervals of minutes, hours, days or weeks. If appropriate the active agents may be administered in a regular repeating cycle.

The term "about," as used herein when referring to a measurable value such as an amount, dose, time, temperature, activity, level, number, frequency, percentage, dimension, size, amount, weight, position, length and the like, is meant to encompass variations of ±20%, ±10%, ±5%, ±1%, ±0.5%, or even ±0.1% of the specified amount, dose, time, temperature, activity, level, number, frequency, percentage, dimension, size, amount, weight, position, length and the like.

The term "agent" refers to any compound or substance, or mixture of compounds or substances, which induces a desired pharmacological and/or physiological effect. The term also encompasses pharmaceutically acceptable and pharmacologically active ingredients of those compounds specifically mentioned herein including but not limited to salts, esters, amides, prodrugs, active metabolites, analogs and the like. When the above term is used, then it is to be understood that this includes the active agent per se as well as pharmaceutically acceptable, pharmacologically active salts, esters, amides, prodrugs, metabolites, analogs, etc. The term "agent" is not to be construed narrowly but extends to small molecules, proteinaceous molecules such as peptides, polypeptides and proteins as well as compositions comprising them and genetic molecules such as RNA, DNA and mimetics and chemical analogs thereof as well as cellular agents. The term "agent" includes a cell that is capable of producing and secreting a polypeptide referred to herein as well as a polynucleotide comprising a nucleotide sequence that encodes that polypeptide. Thus, the term "agent" extends to nucleic acid constructs including vectors such as viral or non-viral vectors, expression vectors and plasmids for expression in and secretion in a range of cells.

As used herein, "and/or" refers to and encompasses any and all possible combinations of one or more of the associated listed items, as well as the lack of combinations when interpreted in the alternative (or).

It will be understood that the term "between" when used in reference to a range of numerical values encompasses the numerical values at each endpoint of the range. For example, a composition comprising between 30 µg and about 1000 µg of copper ion complex or mixture of copper ion complexes is inclusive of a composition comprising 30 µg of copper ion complex or mixture of copper ion complexes and a composition comprising 1000 µg of copper ion complex or mixture of copper ion complexes.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either both of those included limits are also included in the invention.

The term "composition" encompasses compositions and formulations comprising the active ingredients (i.e., the copper ion complex or mixture of copper ion complexes and the hyaluronic acid, salt of hyaluronic acid and mixtures thereof) with or without conventional carriers and/or excipients, including compositions and formulations comprising conventional carriers and/or excipients used in creams, lotions, hydrogels, suppositories, pessaries etc. The carriers and/or excipients are "pharmaceutically acceptable" meaning that they are compatible with the other ingredients of the composition and is not deleterious to a subject. The compositions of the present invention may contain other agents or further active agents, and may be formulated, for example, by employing conventional solid or liquid vehicles or diluents, as well as pharmaceutical additives of a type appropriate to the mode of desired administration (for example, excipients, binders, preservatives, stabilizers, flavours, perfumes etc.) according to techniques such as those well known in the art of pharmaceutical formulation (See, for example, Remington: The Science and Practice of Pharmacy, 21st Ed., 2005, Lippincott Williams & Wilkins).

Throughout this specification, unless the context requires otherwise, the words "comprise," "comprises," and "comprising" will be understood to imply the inclusion of a stated step or element or group of steps or elements but not the exclusion of any other step or element or group of steps or elements. Thus, use of the term "comprising" and the like indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements.

As used herein, the term "opioid" refers to the entire family of opiate drugs including natural, synthetic and semisynthetic opiates.

The terms "patient," "subject," "host," or "individual" used interchangeably herein, refer to any subject, particularly a vertebrate subject, and even more particularly a mammalian subject, for whom therapy or prophylaxis is desired. Suitable vertebrate animals that fall within the scope of the invention include, but are not restricted to, any member of the subphylumn Chordata including primates (e.g., humans, monkeys, and apes, and includes species of monkeys such as from the genus *Macaca* (e.g., cynomolo-gus monkeys such as *Macaca fascicularis*, and/or rhesus monkeys (*Macaca mulatta*) and baboon (*Papio ursinus*), as well as marmosets (species from the genus *Callithrix*), squirrel monkeys (species from the genus *Saimiri*) and tamarins (species from the genus *Saguinus*), as well as species of apes such as chimpanzees (*Pan troglodytes*), rodents (e.g., mice, rats, guinea pigs), lagomorphs (e.g., rabbits, hares), bovines (e.g., cattle), ovines (e.g., sheep), caprines (e.g., goats), porcines (e.g., pigs), equines (e.g., horses), canines (e.g., dogs), felines (e.g., cats), avians (e.g., chickens, turkeys, ducks, geese, companion birds such as canaries, budgerigars, etc.), marine mammals (e.g., dolphins, whales), reptiles (e.g., snakes, frogs, lizards, etc.), and fish. A preferred subject is a human.

As used herein, the terms "prevent," "prevented," or "preventing," refer to a prophylactic treatment which increases the resistance of a subject to developing the disease or condition or, in other words, decreases the likelihood that the subject will develop the disease or condition as well as a treatment after the disease or condition has begun in order to reduce or eliminate it altogether or prevent it from becoming worse. These terms also include within their scope preventing the disease or condition from occurring in a subject which may be predisposed to the disease or condition but has not yet been diagnosed as having it.

As used herein, the terms "treatment," "treating," and the like, refer to administering an agent, or carrying out a procedure (e.g., radiation, a surgical procedure, etc.) to obtain a desired pharmacologic and/or physiologic effect. The effect may be prophylactic in terms of completely or partially preventing a disease or symptom thereof and/or may be therapeutic in terms of effecting a partial or complete cure for a disease and/or symptoms of the disease. The effect may be therapeutic in terms of a partial or complete cure for a disease or condition (e.g., chronic wond healing) and/or adverse effect attributable to the disease or condition. These terms also cover any treatment of a condition or disease in a mammal, particularly in a human, and include: (a) preventing the disease or a symptom of a disease from occurring in a subject which may be predisposed to the disease but has not yet been diagnosed as having it {e.g., including diseases that may be associated with or caused by a primary disease; (b) inhibiting the disease, i.e., arresting its development; (c) relieving the disease, i.e., causing regression of the disease; (d) reducing the severity of a symptom of the disease and/or (e) reducing the frequency of a symptom of the disease or condition.

2. Compositions and Methods

In a first aspect, the present invention provides a composition comprising:

(i) hyaluronic acid, a salt of a hyaluronic acid or a mixture thereof; and (ii) a copper ion complex or mixture of copper ion complexes obtained by a process comprising:

(a) contacting copper having a specific surface area of from about 0.1 m$^2$/kg to about 2 m$^2$/kg, or in the form of particles having a bulk density of between about 0.2 and about 8.0 g/cm$^3$, with a chelating agent in solid form; and (b) while the copper is in contact with the chelating agent, contacting the copper and chelating agent with an oxidising agent, to form the copper ion complex or mixture of copper ion complexes.

In a second aspect, the present invention provides a composition comprising:

(i) hyaluronic acid, a salt of a hyaluronic acid or a mixture thereof; and (ii) a copper ion complex or a mixture of copper ion complexes comprising copper coordinated to a ligand of Formula (I) or Formula (II) or Formula (VI)

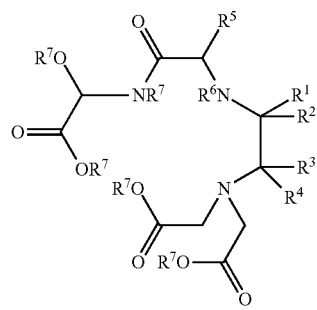

Formula (I)

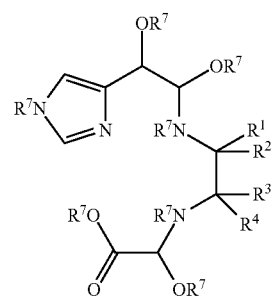

Formula (II)

-continued

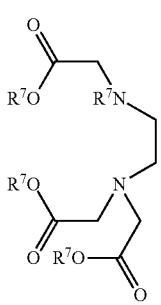

Formula (VI)

wherein
R$^1$ is H and R$^2$ is H or OH, or R$^1$ and R$^2$ together with the carbon atom to which they are attached form a carbonyl (C=O);
R$^3$ is H and R$^4$ is H or OH, or R$^3$ and R$^4$ together with the carbon atom to which they are attached form a carbonyl (C=O);
R$^5$ is —CH(OR$^7$)CH$_2$OR$^7$ or —CH$_2$CO$_2$R$^7$ and R$^6$ is absent or H, or R$^5$ is H and R$^6$ is —CH(OR$^7$) CH$_2$OR$^7$ or —CH$_2$CO$_2$R$^7$; and
each R$^7$ is independently absent or H;
or a salt thereof, tautomer thereof or polymer thereof.

The compositions of the present invention comprise hyaluronic acid, a salt of a hyaluronic acid or a mixture thereof. Hyaluronic acid (HA; also called hyaluronan) is an anionic, non-sulfated glycosaminoglycan. The term "hyaluronic acid" is used generally in the art to refer to the acid form of hyaluronic acid as well as salts of hyaluronic acid and mixtures thereof. As used herein, except where the context requires otherwise due to express language or necessary implication, the term "hyaluronic acid" is used in a general sense and is intended to refer to the acid form of hyaluronic acid as well as salts of hyaluronic acid and mixtures thereof.

Naturally occurring hyaluronic acid is typically found distributed widely throughout connective, epithelial, and neural tissues. It is unique among glycosaminoglycans in that it is non-sulfated, forms in the plasma membrane instead of the Golgi apparatus, and can be very large, with its molecular weight often approaching the range of 106 Da. Hyaluronic acid is one of the main components of the extracellular matrix, and contributes to cell proliferation and migration.

Hyaluronic acid has found significant application in the cosmetics industry where it is typically used as a gelling agent and/or moisturising agent, most notably in skin care products. Hyaluronic acid can have a range of properties depending on the form of the hyaluronic acid employed. Properties of hyaluronic acid may be affected by, for example, molecular weight, intrinsic pH, counterion (i.e., salt) or biological source (e.g., whether isolated from bacteria, cows, sheep, pigs, chickens etc.).

Hyaluronic acid is widely available from a range of commercial suppliers including Sigma Aldrich, Pure Bulk and Alibaba. Commercial suppliers also supply a range of different forms of hyaluronic acid. For example, it is possible to select desired molecular weight, counterion (i.e., salt) etc. from commercial suppliers (e.g., Sigma Aldrich offers sodium hyaluronate having the following molecular weight ranges (in Da): 1,200; 8,000-15,000; 10,000-30,000; 15,000-30,000; 30,000-50,000; 50,000-70,000; 70,000-90,000; 70,000-120,000; 90,000-110,000; 120,000-350,000; 130,000-150,000; 150,000-300,000; 300,000-500,000; 500,000-750,000; 750,000-1,000,000; 1,000,000-1,250,000; 1,250,000-1,500,000; 1,500,000-1,750,000; 1,750,000-2,000,000; 2,000,000-2,200,000; 2,000,000-2,400,000). Different molecular weights and weight ranges of hyaluronic acid are also widely available.

In some embodiments, an enhancement of the bioavailability of the copper ion complex or mixture of copper ion complexes is observed for the composition of the present invention compared to the copper ion complex or mixture of copper ion complexes absent the hyaluronic acid. In some embodiments, an enhancement of the bioactivity of the copper ion complex or mixture of copper ion complexes is observed for the composition of the present invention compared to the copper ion complex or mixture of copper ion complexes absent the hyaluronic acid.

In some embodiments, the salt of hyaluronic acid is selected from the sodium salt (i.e., sodium hyaluronate), potassium salt (i.e., potassium hyaluronate) and mixtures thereof. In some embodiments, the salt of hyaluronic acid is sodium hyaluronate.

A variety of hyaluronic acid samples having molecular weights ranging from 50-100 kDa to 10$^6$ Da were tested. A selection of compositions comprising hyaluronic acid with an average molecular weight of 10$^6$ Da are described below in the Examples. Similar results were observed across the range of molecular weights tested, with greater improvements in bioactivity, bioavailability and efficacy generally being observed with hyaluronic acids having higher molecular weights (e.g., around or above about 0.5×10$^6$ Da, especially around or above about 10$^6$ Da).

Hyaluronic acid is typically supplied in a form wherein the molecular weight is a range rather than a discreet value. In some embodiments, the molecular weight of a substantial portion (e.g., more than 50, 60, 70, 80, 90, 95, 97, 98, 99, 99.5 or 99.9% w/w) of the hyaluronic acid is in the range of from about 500 Da to about 10$^7$ Da (for example, from about 10$^3$ to about 10$^7$ Da, from about 10$^4$ to about 10$^7$ Da, from about 10$^5$ to about 10$^7$ Da, from about 10$^6$ to about 10$^7$ Da, from about 10$^3$ to about 10$^6$ Da, from about 10$^4$ to about 10$^6$ Da, from about 10$^5$ to about 10$^6$ Da, from about 10$^3$ to about 10$^5$ Da, from about 10$^4$ to about 10$^5$ Da or from about 10$^3$ to about 10$^4$ Da). In some embodiments, the composition of the present invention comprises 2, 3, 4, 5, 6, 7, 8 or more molecular weight ranges of hyaluronic acid (for example, a mixture of low molecular weight hyaluronic acid (e.g., 50-100 kDa) and high molecular weight hyaluronic acid (e.g., 10$^5$-10$^6$ Da)).

In some embodiments, the amount of the hyaluronic acid in the composition is in the range of from about 0.01 to about 80% by mass based on the total mass of the composition. In some embodiments, the amount of the hyaluronic acid in the composition is in the range of from about 0.1 to about 50% by mass based on the total mass of the composition (for example, from about 0.1 to about 10%, from about 0.1 to about 5%, from about 0.1 to about 2%, from about 0.2 to about 5%, from about 0.2 to about 2%, from about 0.5 to about 5%, from about 0.5 to about 2% or from about 0.5 to about 1% by mass based on the total mass of the composition).

As a person skilled in the art will appreciate, the amount of hyaluronic acid used in the composition will typically depend on the molecular weight of the hyaluronic acid used and the desired properties of the composition.

Some properties of the composition may be adjusted by varying the molecular weight and/or amount of hyaluronic acid in the composition. This may be useful depending on the intended use or form of the composition. For example, physical properties such as viscosity, rheology, and/or hardness may be affected by varying the molecular weight and/or amount of hyaluronic acid in the composition. A person skilled in the art will be able to select appropriate molecular weights and/or amounts of hyaluronic acid depending on the intended use or form of the compositions of the present invention. For example, if a less viscous composition is required (e.g., mouthwash, gel spray or nasal spray), a lower molecular weight hyaluronic acid may be selected and/or the amount of the hyaluronic acid in the composition may be reduced. If a more viscous composition is required (e.g., hard or soft gel, suppository, pessary or pastille), a higher molecular weight hyaluronic acid may be selected and/or the amount of the hyaluronic acid in the composition may be increased.

As an example, a 2% w/w, $10^6$ Da sodium hyaluronate solution in water is a very thick gel, similar in consistency to honey, whereas a 2% w/w, 500 Da sodium hyaluronate solution in water is only marginally more viscous than water itself. As a further example, if the composition is to be formulated as a gel, it may be possible to form a gel using 50% w/w of very low molecular weight hyaluronic acid (e.g., 500 Da), whereas it is difficult to form a gel using high molecular weight hyaluronic acid (e.g., $10^6$ Da) above about 5% w/w.

In some embodiments, the amount of copper ion complex or mixture of copper ion complexes in the composition is in the range of from about 0.01 to about 95% by mass based on the total mass of the composition. In some embodiments, the amount of copper ion complex or mixture of copper ion complexes in the composition is in the range of from about 0.1 to about 50% by mass based on the total mass of the composition (for example, from about 0.1 to about 20%, from about 0.1 to about 10%, from about 0.1 to about 5%, 0.2 to about 20%, from about 0.2 to about 10%, from about 0.2 to about 5%, 0.5 to about 20%, from about 0.5 to about 10%, from about 0.5 to about 5%, 1 to about 20%, from about 1 to about 10%, from about 1 to about 5%, 2 to about 20%, from about 2 to about 10%, from about 2 to about 5% or from about 0.3 to about 10% by mass based on the total mass of the composition).

In some embodiments, the compositions of the present invention comprise a copper ion complex or mixture of copper ion complexes obtained by a process comprising:
  (a) contacting copper having a specific surface area of from about 0.1 $m^2$/kg to about 2 $m^2$/kg, or in the form of particles having a bulk density of between about 0.2 and about 8.0 g/$cm^3$, with a chelating agent in solid form; and
  (b) while the copper is in contact with the chelating agent, contacting the copper and chelating agent with an oxidising agent, to form the copper ion complex or mixture of copper ion complexes.

The process referred to above for obtaining or preparing a copper ion complex or mixture of copper ion complexes is referred to herein as the "the process of the present disclosure" or sometimes simply "the process". An analogous process is described in WO 2016/201524 A1, the contents of which is incorporated herein by reference. The process of the present disclosure (and as described in WO 2016/201524 A1) can provide copper ion complexes and mixtures of copper ion complexes which are not obtainable by other processes.

In the process of the present disclosure, the copper has a specific surface area of from about 0.1 $m^2$/kg to about 2 $m^2$/kg, or is in the form of particles having a bulk density of between about 0.2 and about 8.0 g/$cm^3$. As a person skilled in the art will appreciate, although an exact relationship between these measurements may not exist, the specific surface area and the bulk density are both measures related to the available surface area of the copper. It may, in some circumstances, be convenient to refer to the specific surface area of the copper rather than the bulk density. In other circumstances, it may be convenient to refer to the bulk density of the copper rather than the specific surface area.

The specific surface area is a property of solid materials and is defined as the surface area of the material per unit of mass or volume. It will be noted that a person skilled in the art will be able to interconvert units of $m^2$/kg and $m^2$/$m^3$ using the density of the solid material. The specific surface area may be determined theoretically (e.g., calculating the surface area of a material mathematically using the shape and the density/weight (or assumptions regarding the shape and/or the density/weight), for example calculating the surface area of wire mathematically from the diameter and length(s) of the wire and using the density or weight of the wire) or by experimental methods known to those skilled in the art. Copper may also be supplied with a known or reported specific surface area.

In the process of the present disclosure, copper having a specific surface area of from about 0.1 $m^2$/kg to about 2 $m^2$/kg may be used. In some embodiments, the copper has a specific surface area of from about 0.2 $m^2$/kg to about 1.8 $m^2$/kg, for example, from about 0.3 $m^2$/kg to about 1.5 $m^2$/kg, from about 0.5 $m^2$/kg to about 1.5 $m^2$/kg, from about 1 $m^2$/kg to about 1.5 $m^2$/kg, from about 0.7 $m^2$/kg to about 1.3 $m^2$/kg, from about 0.8 $m^2$/kg to about 1.2 $m^2$/kg, from about 0.9 $m^2$/kg to about 1.1 $m^2$/kg or about 1 $m^2$/kg, especially from about 0.5 $m^2$/kg to about 1.5 $m^2$/kg. In some embodiments, it may be beneficial to heat the reaction to encourage the reaction to go to completion, particularly when using copper having a lower specific surface area (e.g., from about 0.1 $m^2$/kg to about 0.3 $m^2$/kg).

In the process of the present disclosure, the copper having a specific surface area of from about 0.1 $m^2$/kg to about 2 $m^2$/kg may be in the form of particles, for example, copper turnings, wire, ribbon, granules, powder, a solid bar having any shape, or any other suitable particulate form.

Bulk density is a property of particles (e.g., powders, granules, and other "divided" solids or particulate matter). It is the mass of the particles of the material divided by the total volume they occupy. The total volume includes particle volume, inter-particle void volume, and internal pore volume. The bulk density of the copper particles may be determined by, for example, adding 100 g of the copper particles to a 200 mL measuring cylinder (graduated cylinder). The initial volume measured in the measuring cylinder is the "freshly settled" volume. The measuring cylinder is then picked up and dropped 3 times from a height of 2 cm onto a solid surface. The volume measured in the measuring cylinder at this stage is the "tapped" volume. The bulk density is thus determined by the formula:

$$\text{bulk density (in g/mL or g/cm}^3\text{)} = \frac{100}{\text{measured volume (in mL or } m^3\text{)}}$$

As used herein, all references to the bulk density of copper particles refer to the "tapped" bulk density, as determined by the procedure described above unless expressly stated otherwise.

In the process of the present disclosure, copper in the form of particles having a bulk density of between about 0.2 and about 8.0 g/cm$^3$ may be used. In some embodiments, the copper has a bulk density of between about 0.3 and about 4.0 g/cm$^3$, for example, between about 0.5 and about 3.0 g/cm$^3$, between about 0.5 and about 2.5 g/cm$^3$, between about 0.7 and about 2.0 g/cm$^3$, between about 0.8 and about 1.7 g/cm$^3$ or between about 0.9 and about 1.5 g/cm$^3$.

In the process of the present disclosure, the copper in the form of particles having a bulk density of between about 0.2 and about 8.0 g/cm$^3$ may, for example, be in the form of copper turnings, wire, ribbon, granules, powder, a solid bar having any shape, or any other suitable particulate form.

In some embodiments, the copper has a specific surface area of from about 0.1 m$^2$/kg to about 2 m$^2$/kg and is also in the form of particles having a bulk density of from about 0.2 to about 8.0 g/cm$^3$.

In some embodiments, the copper may have an oxide (or other) layer, or develop an oxide (or other) layer prior to being used in the process. In these embodiments, the term "contacting the copper" is taken to apply to contacting the bulk copper (i.e., the copper including any oxide (or other) layer with the appropriate agent. This may occur by contacting the oxide (or other) layer exclusively, or contacting the oxide (or other) layer and the elemental copper simultaneously (both the elemental copper and layer at the same time). The process of the present disclosure embraces both of these alternatives, so long as the copper is able to react with the other agents. In some embodiments the copper may be pre-treated prior to the process in order to remove or reduce an oxide (or other) layer on the copper.

In some embodiments, the copper used in the process is in the form of an alloy comprising copper and one or more other metals (for example, an alloy with one or more other metals selected from zinc, tin, aluminium, silicon, nickel, iron, manganese, lead, silver, gold). In some embodiments, the alloy comprises more than about 20% by weight copper (e.g., more than about 50%, more than about 60%, more than about 70%, more than about 80%, more than about 90%, more than about 95%, more than about 97%, more than about 98%, more than about 99%, more than about 99.5%, more than about 99.9% or more than about 99.99%).

The process of the present disclosure comprises a step (a) of contacting copper (having a specific surface area of from about 0.1 m$^2$/kg to about 2 m$^2$/kg or in the form of particles having a bulk density of between about 0.2 and about 8.0 g/cm$^3$) with a chelating agent in solid form.

The chelating agent is in solid form in step (a) of the process. In this context, "solid form" refers to the chelating agent being a solid. Typically the chelating agent is in the form of a granulated or powdered solid. At least a portion of the chelating agent is in solid form when contacting the copper and when the copper and chelating agent is first contacted with the oxidising agent. Without wishing to be bound by theory, it is believed that the copper being in contact with the chelating agent in solid form when the copper and the chelating agent is contacted with the oxidising agent leads to a concentration gradient being established between the copper and the chelating agent in the resultant reaction mixture. Without wishing to be bound by theory, it is believed that, as a result of this concentration gradient, the process can result in the formation of different copper ion complexes to those formed when the chelating agent is in solution prior to the chelating agent being contacted with the copper.

In some embodiments, the chelating agent comprises a nitrogen and/or an oxygen donor.

In some embodiments, the chelating agent is a multidentate ligand capable of forming a stable metal ion complex. In some embodiments, the chelating agent is bidentate, tridentate, tetradentate, pentadentate or hexadentate.

In some embodiments, the chelating agent is neutral, positively charged or negatively charged. In some embodiments, the chelating agent is zwitterionic. In some embodiments, the chelating agent is used as its corresponding hydrate. In embodiments that include charged chelating agents, the chelating agent may be used as any suitable salt (i.e., a charged chelating agent with any suitable counterion).

In some embodiments, the chelating agent comprises a nitrogen and/or an oxygen donor. In this regard, the nitrogen and/or oxygen atom is part of a functional group on the chelating agent. The nitrogen and/or oxygen atom is able to donate electrons to the metal centre (i.e., copper) to thus form a coordinate bond and thus the coordinate complex (i.e., copper ion complex). In some embodiments, the chelating agent comprises a nitrogen donor. In some embodiments, the chelating agent comprises an oxygen donor. In some embodiments, the chelating agent comprises a sulfur donor. In some embodiments, the chelating agent comprises both a nitrogen donor and an oxygen donor. In some embodiments, not all of the nitrogen and/or oxygen donors and/or sulphur donors (when present) form a coordinate bond with the metal centre.

In some embodiments the chelating agent comprises one or more (e.g., 1, 2, 3, 4, 5 or 6) carboxylic acid (or carboxylate) groups. In some embodiments the chelating agent comprises one or more (e.g., 1, 2, 3, 4, 5 or 6) amino groups, wherein the amino group(s) may each independently be a primary, secondary or tertiary amino group. In some embodiments the chelating agent may comprise one or more (e.g., 1, 2, 3, 4, 5 or 6) imidodiacetic acid [—N(CH$_2$CO$_2$H)$_2$] groups, wherein one or both of the methylene (—CH$_2$) hydrogen atoms may be replaced with another substituent, such as a C$_1$-C$_4$ alkyl group.

In some embodiments, the chelating agent is selected from the group consisting of ethylenediaminetetraacetic acid (EDTA), diethylenetriaminepentaacetic acid (DTPA), hydroxyethylenediaminetetraacetic acid (HEDTA), ethylenediaminedisuccinic acid (EDDS), salicylic acid, acetyl salicylic acid, amino acids (e.g., glycine, histidine, lysine, arginine, cysteine, methionine), peptides (e.g., comprising 2 or more residues of amino acids such as glycine, histidine, lysine, arginine, cysteine, methionine), and salts thereof and hydrates thereof. The salts thereof may be any suitable salt (i.e., contain any suitable counterion). The structures of EDTA, DTPA, HEDTA and EDDS are shown below:

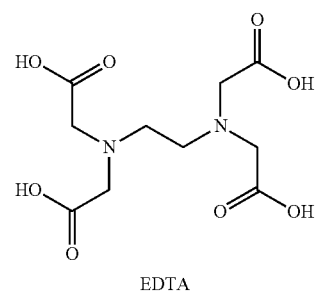

EDTA

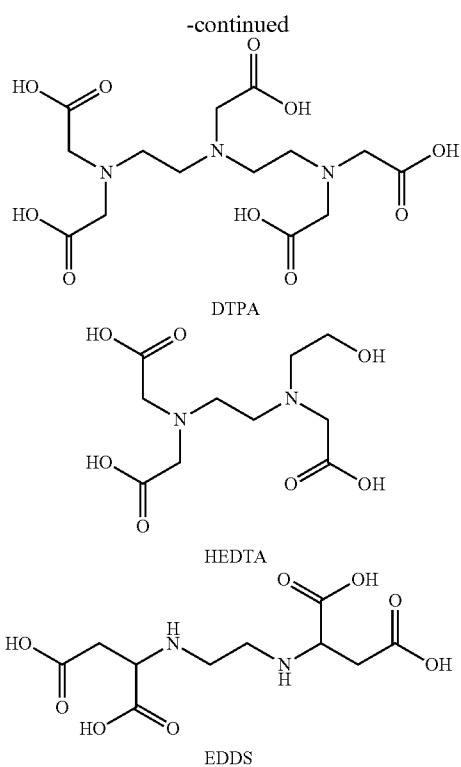

DTPA

HEDTA

EDDS

EDTA is a hexadentate chelating ligand with 6 possible coordination sites. The pKa of the carboxylic acid residues of EDTA are 1.70, 2.60, 6.30 and 10.60, respectively. Neutral EDTA can exist as a zwitterion with one or two protons located on one or two of the nitrogen atoms.

In some embodiments, the chelating agent is ethylenediaminetetraacetic acid (EDTA), a salt of ethylenediaminetetraacetic acid (EDTA) or a mixture thereof or a hydrate thereof. In some embodiments, the salt of EDTA comprises one or more of sodium ions, potassium ions, lithium ions, calcium ions, magnesium ions, or mixtures thereof. In particular embodiments, the chelating agent is EDTA disodium salt (disodium EDTA). In other particular embodiments, the chelating agent is calcium disodium EDTA.

The process of the present disclosure comprises a step (b) of, while the copper is in contact with the chelating agent, contacting the copper and chelating agent with an oxidising agent, to form the copper ion complex or mixture of copper ion complexes.

In some embodiments, the oxidising agent is selected from the group consisting of peroxides, peracids, ozone, oxidising salts and N-oxides (e.g., (2,2,6,6-tetramethylpiperidin-1-yl)oxyl also known as TEMPO). In particular embodiments, the oxidising agent is a peroxide, especially hydrogen peroxide.

In some embodiments, the oxidising agent is in solution when contacting the copper and chelating agent. The solvent used to make the solution may be any suitable solvent. In order to be suitable, the oxidising agent should not react with (or react to any appreciable amount with) the solvent. In addition, the oxidising agent should maintain its ability to act as an oxidising agent while in solution. In some embodiments, the oxidising agent is in an aqueous solution.

In some particular embodiments, the oxidising agent is hydrogen peroxide and the hydrogen peroxide is in an aqueous solution. In such embodiments, the aqueous solution of hydrogen peroxide may comprise hydrogen peroxide in an amount within the range of about 0.01 wt. % to about 100 wt. %. For example, in various embodiments, the aqueous solution of hydrogen peroxide is within the range of about 0.01 wt. % to about 70 wt. %, about 0.5 wt. % to about 60 wt. %, about 1 wt. % to about 60 wt. %, about 1 wt. % to about 15 wt. %, about 15 wt. % to about 30 wt. %, about 20 wt. % to about 30 wt. %, about 30 wt. % to about 40 wt. %, or about 45 wt. % to about 55 wt. %, particularly in the range of about 5 wt. % to about 60 wt. %, especially about 30 wt. % or about 50 wt. %.

The process of the present disclosure comprises contacting copper with a chelating agent. In an embodiment, the copper is added to the chelating agent. In another embodiment, the chelating agent is added to the copper. In either of these embodiments, the end result is that the copper and chelating agent are in contact with each other. In other words, the copper and chelating agent are in intimate physical contact. In some embodiments, the copper and chelating agent are combined and mixed to form a mixture in which the copper and chelating agent are in contact with each other.

The process of the present disclosure comprises contacting the copper and chelating agent (while the copper is in contact with the chelating agent) with an oxidising agent. In some embodiments, the copper in contact with the chelating agent is added to the oxidising agent. In other embodiments, the oxidising agent is added to the copper and chelating agent (while the copper is in contact with the chelating agent).

In some embodiments, the oxidising agent is added to the copper/chelating agent at one time. In other embodiments, the copper/chelating agent is added to the oxidising agent at one time. Alternatively, in other embodiments, the oxidising agent is added to the copper/chelating agent in a portionwise fashion over a period of time. For example, the oxidising agent may be added portionwise over about 5 seconds to about 1 hour or 2 to 3 weeks. In other embodiments, the copper/chelating agent is added to the oxidising agent in a portionwise fashion over a period of time as above. In further alternative embodiments, the addition of the oxidising agent to the copper/chelating agent, or the copper/chelating agent to the oxidising agent, is performed in a continuous fashion over a period of time. For example, addition can be made by a syringe pump or solids addition funnel or other apparatus known to those skilled in the art. Those skilled in the art would be able to gauge an appropriate rate of addition taking into consideration factors such as concentration, temperature, reagents, etc.

In some embodiments, the process of the present disclosure is carried out as a "one pot" process. In some embodiments, the process is carried out in a stepwise fashion, including stepwise addition of the oxidising agent and/or copper/chelating agent to the other.

In some embodiments, the copper/chelating agent is wetted with a solvent, especially water, prior to contacting the oxidising agent. In this regard, "wetted" refers to the application of an amount of solvent or water to the copper/chelating agent. This typically involves applying an amount sufficient to cover the copper/chelating agent. The amount of solvent applied is insufficient to dissolve the copper/chelating agent (i.e., at least a portion of the copper/chelating agent, typically a substantial portion of the copper/chelating agent, remains in solid form).

In some embodiments, the copper and chelating agent are above ambient temperature (for example at above about 30° C., above about 40° C., above about 50° C., above about 60° C., above about 70° C., above about 75° C., above about 80°

C. or at about 85° C.; e.g., in the range of about 30° C. to about 100° C., about 30° C. to about 90° C. about 30° C. to about 80° C. about 40° C. to about 90° C. about 60° C. to about 90° C. or about 80° C. to 90° C.) when the copper and chelating agent are contacted with the oxidising agent. In some embodiments, the copper and chelating agent are heated before being contacted with the oxidising agent.

In some embodiments, the oxidising agent is above ambient temperature when the copper and chelating agent are contacted with the oxidising agent. In some embodiments the oxidising agent is above room temperature when contacting the copper and chelating agent. For example, the oxidising agent may be at above about 30° C., above about 40° C., above about 50° C., above about 60° C., above about 70° C., above about 75° C., above about 80° C. or at about 85° C.; e.g., in the range of about 30° C. to about 100° C., about 30° C. to about 90° C., about 30° C. to about 80° C., about 40° C. to about 90° C., about 60° C. to about 90° C. or about 80° C. to 90° C.

In some particular embodiments, both the copper/chelating agent and the oxidising agent are above ambient temperature when contacting each other.

In some embodiments, the copper and chelating agent are heated when the oxidising agent is contacted with the copper and chelating agent. In some embodiments, heat is applied to the copper before it contacts the chelating agent, thereby elevating the temperature of the copper/chelating agent above ambient temperature. In some embodiments, heat is applied to the chelating agent before it contacts the copper, thereby elevating the temperature of the copper/chelating agent above ambient temperature. In some embodiments, heat is applied to the copper/chelating agent while the copper is in contact with the chelating agent, and before the oxidising agent is contacted with the copper and chelating agent, in order to bring it to above an ambient temperature. In some embodiments, heat is applied to the copper/chelating agent whilst the oxidising agent contacts the copper/chelating agent.

In some embodiments, heat is applied during step (b) to raise the temperature above ambient temperature. In some embodiments, heat is applied during step (c) to raise the temperature above ambient temperature.

In some embodiments, heat is applied continuously, whilst in other embodiments heat is applied at time intervals that may be regular or irregular. Heat may be applied, for example, by means of a heating mantle, heating jacket, hotplate, microwave or any other means, or any combination thereof, in order to raise the temperature above ambient temperature.

Modification of the temperature may be used to control the rate of reaction. Accordingly, the process of the present disclosure may optionally include one or more heating or cooling steps at any stage. For example, heat may be applied to the reaction in order to encourage the reaction to go to completion in a shorter period of time.

In some embodiments, the ratio of copper:chelating agent in moles is within the range of about 1:5 to about 100:1. In various embodiments, the ratio of copper:chelating agent is within the range of about 1:1 to about 50:1, about 1:1 to about 40:1, about 1:1 to about 10:1, about 2:1 to about 30:1, about 3:1 to about 20:1, about 4:1 to about 20:1, or about 4:1 to about 10:1, particularly about 1:1 to 50:1. In some embodiments the ratio is about 5:1. In some embodiments, an excess of copper is used.

In some embodiments, the ratio of chelating agent:oxidising agent in moles is within the range of about 2:1 to about 1:100. In various embodiments, the ratio of chelating agent:oxidising agent is within the range of about 1:1 to about 1:50, about 1:1 to about 1:20, about 1:2 to about 1:20, about 1:2 to about 1:10 or about 1:3 to about 1:5, particularly about 1:1 to 1:20 or about 1:3.3.

In some embodiments, the amount of copper added is sufficient to consume substantially all of the oxidising agent. In some embodiments, the amount of chelating agent added is sufficient to complex substantially all of the copper. In some embodiments, adding an excess of the chelating agent may slow the reaction down.

In some embodiments, the amount of copper used in the reaction is from about 50 g to about 250 kg, for example, from about 100 g to about 100 kg, from about 500 g to about 50 kg, from about 1 kg to about 20 kg, from about 1 kg to about 10 kg, especially about 1 kg, about 2 kg, about 3 kg, about 4 kg, about 5 kg, about 6 kg, about 7 kg, about 8 kg, about 9 kg, about 10 kg and all amounts in between.

In particular embodiments, the chelating agent is ethylenediaminetetraacetic acid (EDTA) disodium salt and the oxidising agent is aqueous hydrogen peroxide. In more particular embodiments, the oxidising agent is aqueous hydrogen peroxide, the ratio of copper:ethylenediaminetetraacetic acid (EDTA) disodium salt in moles is about 1:1 to about 50:1 and the ratio of copper:hydrogen peroxide in moles is about 1:1 to about 1:20.

In some particular embodiments, copper in contact with the chelating agent is maintained at above about 75° C. (e.g., about 80° C. to 90° C.) when the copper and chelating agent are contacted with the oxidising agent such as hydrogen peroxide, the oxidising agent also being at above about 75° C. (e.g., about 80° C. to 90° C.).

In some particular embodiments, copper in contact with EDTA disodium salt is maintained at above about 75° C. when the copper and EDTA are contacted with the hydrogen peroxide, the hydrogen peroxide also being at above about 75° C.

In some embodiments, the copper and chelating agent may be mixed by any suitable mixing techniques known to those skilled in the art. For example, mixing may be performed by mechanical or magnetic stirring, sonication, shaking, swirling, folding, whipping, inverting the reaction vessel etc.

In some embodiments, the process of the present disclosure further comprises a step of removing unreacted copper and/or unreacted chelating agent and/or unreacted oxidising agent.

The process of the present disclosure typically comprises the further step (c) of allowing the combination of agents resulting from step (b) to react until completion, i.e., allowing the oxidising agent, copper and chelating agent to react until completion. In other words, the oxidation reaction(s) initiated by the oxidising agent is (are) allowed to go to completion. In some embodiments, at least a portion of the chelating agent remains in solid form during step (c).

In the context of the process of the present disclosure, there are several characteristics to indicate to a person skilled in the art that the reaction has gone to completion.

In some embodiments, the completion of the reaction may be indicated by an "exothermic explosion". The "exothermic explosion" may be considered a period towards the end of the reaction where the reaction enters an exothermic phase. For example, the exothermic reaction may lead to a thermal runaway or a runaway reaction whereby the heat generated from the exothermic nature of the reaction(s) increases the rate of the reaction in a positive feedback, leading to a period of highly exothermic reaction. In embodiments that contain solvents, particularly low-boiling solvents, or any other low-boiling reagent or component, these may be quickly converted to their gaseous states and have the appearance of an explosion. Other indicators that the reaction is reaching completion may include the release of water vapour, $CO_2$, ozone, oxygen and/or other gaseous products. In some embodiments, the reaction mixture appears to "boil" with bubbles of gaseous products. For example, and without wishing to be constrained by theory, in the case of an embodiment using disodium EDTA as the chelating agent and $H_2O_2$ as the oxidising agent, there is believed to be a decarboxylation event as the reaction nears completion, which affords bubbles of $CO_2$.

In some embodiments, the completion of the reaction may be indicated by a change in the colour of the reaction. In some embodiments, the reaction mixture changes colour from blue to a greenish blue colour, indicating the completion of the reaction (e.g., from about Pantone® 2386 C, for example, to about Pantone® 306 UP, for example).

In other embodiments, the completion of the reaction may be indicated by the formation of specific copper ion complexes as determined by chromatographic techniques, such as, for example, HPLC.

Allowing the combination to react until completion comprises allowing the combination to react for a sufficient period of time for the reaction to proceed until completion. In some embodiments, allowing the resulting combination to react until completion involves allowing the combination to react for extended periods, for example, the combination may be left for 2 to 5 weeks in order to go to completion. In some embodiments, the combination will react for 1 day, 2 to 7 days, 1 to 2 weeks or 1 to 3 weeks before entering an exothermic phase. In embodiments where the reaction mixture is heated at the outset, it is more likely that the reaction will go to completion within a shorter period of time. For example, the reaction may go to completion in about 5 to 15 mins, about 15 to 30 mins about 30 mins to 1 hour or about 1 to 2 hours, when the reaction components are heated.

In some embodiments, the combination will react until all of the oxidising agent is consumed. In some embodiments, the combination will react until all of the chelating agent is consumed. In some embodiments, the combination will react until all of the copper is consumed.

In some embodiments, the process of the present disclosure may further include an additional step of isolating the copper ion complex or mixture of copper ion complexes from the reaction mixture. Suitable methods of isolation include solvent evaporation, recrystallisation, solvent extraction, filtration, chromatography and other methods known to those skilled in the art. In some embodiments, the mixture resulting from the process is evaporated or lyophilized to obtain a solid or gel comprising the copper ion complex. The copper ion complex may be purified, e.g., by chromatographic techniques or by recrystallization from a suitable solvent.

In some embodiments, the process of the present disclosure forms a single species of copper ion complex. In other embodiments, the process forms multiple species of copper ion complexes (i.e., a mixture of copper ion complexes). These multiple species may be produced simultaneously or sequentially, and may be kept together as a mixture, or separated in a subsequent step.

In some embodiments, the reaction mixture (containing the copper ion complex or mixture of copper ion complexes) is used in the subsequent step (e.g., in the preparation of a composition of the present invention) without further purification. In such embodiments, the copper ion complex or mixture of copper ion complexes may be in solution (e.g., the solution from the reaction mixture) and may be combined with a gelling agent or stabilising agent prior to the subsequent step. In some embodiments, the reaction mixture is allowed to settle (e.g., under gravity or by centrifugation) and the supernatant (containing the copper ion complex or mixture of copper ion complexes) is used in the subsequent step without further purification. In other embodiments, solids may be removed by filtration and the filtrate used in the subsequent step without further purification. In such embodiments, the supernatant or filtrate may be combined with a gelling agent or stabilising agent prior to the subsequent step. In these embodiments, the subsequent step may be combination with one or more components used in the preparation of a composition of the present invention.

It will be appreciated that in embodiments wherein the copper ion complex or mixture of copper ion complexes obtained from the process of the present disclosure is/are used without further purification in the preparation of a composition of the present invention, there may be other components accompanying the copper ion complex or mixture of copper ion complexes (e.g., solvent such as water). In such embodiments, the amount of the copper ion complex or mixture of copper ion complexes is taken to be the solids content of the material. For example, if the process affords 10 g of a solution which has a solids content of 42%, the amount of copper ion complex or mixture of copper ion complexes will be taken to be 4.2 g.

The copper ion complex or mixture of copper ion complexes obtained from the process of the present disclosure may, under certain conditions, degrade or lose activity upon contact with incompatible materials (e.g., contacting active ionic surfaces like "soda glass" and some polymers/plastics or being exposed to acidic or basic conditions (e.g., pH below about 4 or above about 12, particularly below about 5 or above about 8)). Accordingly, in some embodiments, the copper ion complex or mixture of copper ion complexes obtained from the process of the present disclosure are stored or transferred in containers or vessels substantially free of active ionic surfaces like "soda glass" and incompatible polymers/plastics. In some embodiments, the copper ion complex or mixture of copper ion complexes of the present disclosure are maintained at a pH of between about 4 and about 12, especially between about 5 and about 8, more especially between about 6.5 and 7. In some embodiments, the composition of the present invention has a pH of between about 4 and about 12, especially between about 5 and about 8, more especially between about 6.5 and 7.

In some embodiments, the copper ion complex or mixture of copper ion complexes prepared by the process of the present disclosure is/are water soluble.

In some embodiments, the copper ion complex or mixture of copper ion complexes prepared by the process of the present disclosure is/are in the form of a salt, such as an alkali earth or alkali metal salt. For example, the complex may be a $Na^+$, $K^+$, $Li^+$, $Mg^{2+}$, or $Ca^{2+}$ salt. In some embodiments, the process of the present disclosure comprises an additional step of exchanging counterions of the salt. Techniques for performing such a step, such as ion exchange chromatography and recrystallization, are known to those skilled in the art. Thus, for example, a salt or protonated form of a copper ion complex (or mixture thereof) may be converted into another salt of choice (e.g., to form a pharmaceutically acceptable salt thereof).

Copper ion complexes prepared according to the process of the present disclosure may be more stable at a particular pH. For example, in some embodiments the copper ion complexes or mixtures of copper ion complexes obtained from the process of the present disclosure may be stable at a pH in the range from about 4 to about 12, preferably in the range from about 4 to about 9. Accordingly, the copper ion complex or mixture of copper ion complexes may, in some embodiments, be combined with a buffer or a pH adjusting agent to provide a stable composition comprising the copper ion complex or mixture of copper ion complexes. In some embodiments, the hyaluronic acid acts as a buffer.

In some embodiments, the compositions of the present invention comprise a copper ion complex or mixture of copper ion complexes comprising copper coordinated to a ligand of Formula (I) or Formula (II) or Formula (VI)

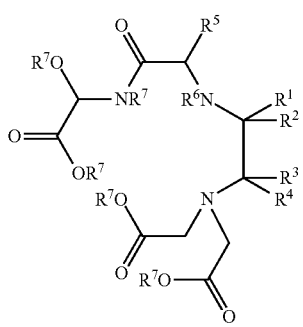

Formula (I)

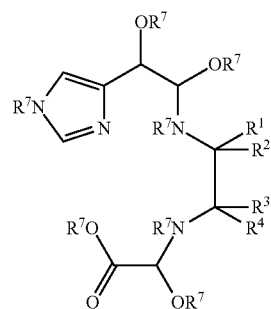

Formula (II)

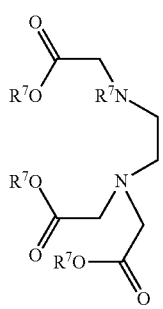

Formula (VI)

wherein
  $R^1$ is H and $R^2$ is H or OH, or $R^1$ and $R^2$ together with the carbon atom to which they are attached form a carbonyl (C=O);
  $R^3$ is H and $R^4$ is H or OH, or $R^3$ and $R^4$ together with the carbon atom to which they are attached form a carbonyl (C=O);
  $R^5$ is —CH(OR$^7$)CH$_2$OR$^7$ or —CH$_2$CO$_2$R$^7$ and $R^6$ is absent or H, or $R^5$ is H and $R^6$ is —CH(OR$^7$)CH$_2$OR$^7$ or —CH$_2$CO$_2$R$^7$; and
  each $R^7$ is independently absent or H;
or a salt thereof, tautomer thereof or polymer thereof.

The preparation of such copper ion complexes and mixtures of copper ion complexes (i.e., copper ion complexes and mixtures of copper ion complexes referred to in the second aspect of the present invention) is described in WO 2016/201524 A1 (it is noted that Formula (VI) was not explicitly referred to WO 2016/201524 A1).

In some embodiments, the ligand is of Formula (I) or a salt thereof, tautomer thereof or polymer thereof, especially where $R^5$ is —CH(OR$^7$)CH$_2$OR$^7$ or —CH$_2$CO$_2$R$^7$ and $R^6$ is absent or H.

In particular embodiments, the ligand is of Formula (Ia)

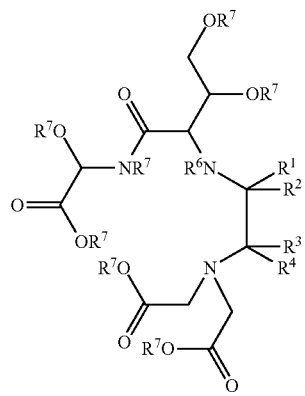

Formula (Ia)

wherein
  $R^1$ is H and $R^2$ is OH, or $R^1$ and $R^2$ together with the carbon atom to which they are attached form a carbonyl (C=O);
  $R^3$ is H and $R^4$ is OH, or $R^3$ and $R^4$ together with the carbon atom to which they are attached form a carbonyl (C=O);
  $R^6$ is absent or H; and
  each $R^7$ is independently absent or H;
or a salt thereof, tautomer thereof or polymer thereof or a ligand is of Formula (Ib)

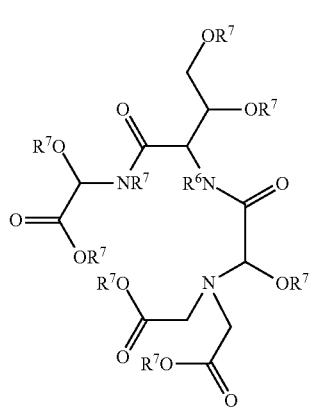

Formula (Ib)

wherein
  $R^6$ is absent or H; and
  each $R^7$ is independently absent or H;
or a salt thereof, tautomer thereof or polymer thereof.

In other embodiments, the ligand is of Formula (II) or a salt thereof, tautomer thereof or polymer thereof, especially a ligand of Formula (IIa)

Formula (IIa)

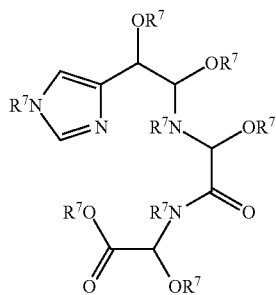

wherein each $R^7$ is independently absent or H.

Such copper ion complexes may be prepared by the process of the present disclosure. For example, in some embodiments, the process of the present disclosure is carried out using copper, EDTA disodium and aqueous hydrogen peroxide, and the reaction is allowed to proceed to completion, to provide a mixture of copper ion complexes including copper ion complexes comprising a ligand of Formula (III) and/or Formula (IV) (described below where M in Formula (III) or Formula (IV) is $Cu^{2+}$ or $Cu^{3+}$) and/or Formula (VI) (where $Cu^{2+}$ and/or $Cu^{3+}$ is chelated to the ligand of Formula (VI)).

The mixture of copper ion complexes may, in some embodiments, further comprise Cu(II) EDTA and/or Cu(III) EDTA.

Copper ion complexes comprising a ligand of Formula (I), Formula (II) or Formula (VI) may, in some embodiments, be formed by other methods. For example, the ligand may be synthesised by methods known in the art, and reacted with (coordinated to) a copper (or copper cation) to form the copper ion complex.

In the ligands of Formula (I) and Formula (II), the substituents $R^6$ and/or $R^7$ may, in some instances, represent H or may be absent. In the ligands of Formula (VI), the substituent $R^7$ may, in some instances, represent H or may be absent. As a person skilled in the art will appreciate, if $R^6$ or $R^7$ are absent, the valency of the heteroatom to which the $R^6$ or $R^7$ is attached (i.e., the N and/or O atom) will be assumed to be satisfied by a lone pair of electrons (resulting in a formal negative charge on the heteroatom). In such instances, the lone pair of electrons/negative charge may, for example, form a salt with another cation (such as $Na^+$, $K^+$, $Ca^{2+}$ etc.) or may, for example, coordinate (i.e., bond) with a copper cation to form a coordination bond (sometimes known as a dative bond) and thus contribute to forming the coordination complex (i.e., copper ion complex). In other words, the negative charge of the —O⁻, —N⁻— or –CO₂— group (provided by the lone pair of electrons) is available for bonding with a proton (H⁺), cation (such as $Na^+$, $K^+$, $Ca^{2+}$ etc.) or the copper ion of the copper ion complex.

For example, in the ligands of Formula (I) or Formula (II) or Formula (VI) —CO₂R⁷ may represent —CO₂H (i.e., a carboxylic acid) when $R^7$ is H, or —CO₂⁻ (i.e., a carboxylate anion) when $R^7$ is absent. Depending on the conditions (pH for example), a carboxylic acid (i.e., —CO₂H) may deprotonate to afford the corresponding carboxylate anion (i.e., —CO₂⁻). Also depending on the conditions, the carboxylate anion may form a salt, for example —CO₂Na (sometimes depicted as —CO₂⁻Na⁺), or may coordinate with the metal ion of the copper ion complex, forming a coordinate bond. This may be depicted, for example, as —CO₂ML$_n$, where M represents the copper ion of the copper ion complex and La represents n ligands or ligating groups where n is an integer. Examples of ligating groups may include functional groups (such as —O⁻, —OH, —N⁻, —NH—, —CO₂H, —CO₂⁻, etc.) on a ligand.

The nature of the coordinate bond, in terms of covalent or ionic character, between a ligand and a copper ion will depend on a number of factors. As a person skilled in the art will appreciate, a bond between a ligand and a copper ion may be ionic, covalent or somewhere in between. The degree of the partial ionic character (or partial covalent character) of a bond may depend on, for example, the electronegativity of the copper ion and/or the electronegativity of the ligating group involved. For example, when the difference in electronegativity between the copper ion and the ligating group is greater, the bond will have a more ionic character. Similarly, when the difference in electronegativity between the copper ion and the ligating group is smaller, the bond will have a more covalent character. The copper ion complexes of the present disclosure comprise a ligand of Formula (I) or Formula (II) or Formula (VI), as described above, bound to a copper ion by 2 or more bonds that may be ionic, covalent, partially ionic, partially covalent or may have any degree of partial ionic character or partial covalent character.

The copper ion complexes of the present disclosure may form tautomers (i.e., may exist in multiple tautomeric forms). A person skilled in the art will understand that tautomers are structural isomers that exist as a rapidly-interconverting mixture in equilibrium. The ratio of the tautomers depends on various factors, for example, temperature, solvent and pH. Most commonly, tautomers differ by the position of a proton. In other words, a deprotonation/protonation sequence occurs to relocate a proton. When the ligands of Formula (I) or Formula (II) or Formula (VI) have a tautomer, each tautomer is embraced in the relevant Formula. For example, Formula (I) embraces both tautomers depicted in the below partial structures:

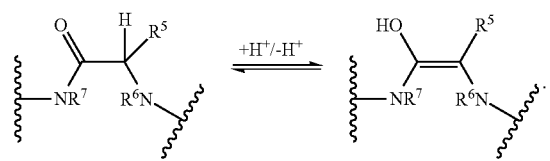

As a further example of tautomeric forms, Formula (I) embraces both tautomers depicted in the below partial structures:

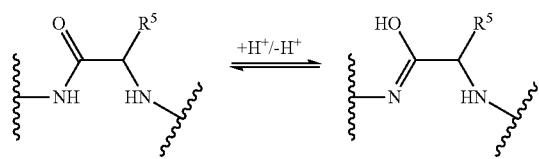

The ligands of Formula (I) or Formula (II) or Formula (VI) may exist in stereoisomeric forms (e.g., enantiomers or diastereomers depending on the number of chiral centers). Mixtures of diastereomers and mixtures of enantiomers (e.g., racemates) can be separated into the stereoisomerically uniform constituents by methods known to persons skilled in the art. Unless otherwise stated, it is intended that any reference herein to a compound or ligand that is capable of existing in stereoisomeric forms (e.g., a copper ion complex comprising a ligand of Formula (I) or Formula (II) or Formula (VI)) is intended to encompass all possible stereoisomers and mixtures of stereoisomers of the compound or ligand (e.g., is intended to encompass all possible enantiomers, mixtures of enantiomers, diastereomers or mixtures of diastereomers).

In some embodiments, the copper ion complex comprising a ligand of Formula (I) or Formula (II) or Formula (VI) comprises a copper ion selected from $Cu^{2+}$ and $Cu^{3+}$.

In some embodiments, the copper ion complex comprises the chelate (i.e., ligand of Formula (I) or (II) or (VI)) and copper ion in a 1:1 stoichiometric ratio or 1:2 stoichiometric ratio (i.e., 1:1 or 1:2 chelate:copper ion). In other embodiments, the copper ion complex comprises the chelate and copper ion in a chelate:copper ion stoichiometric ratio of between 1:3 and 1:8, for example 1:3, 1:4, 1:5, 1:6, 1:7 or 1:8. Suitable counterions may include pharmaceutically acceptable ions such as sodium ions, potassium ions, calcium ions, magnesium ions, etc.

In some embodiments, the ligand of Formula (I) or Formula (II) may be coordinated to the copper ion of the copper ion complex by 2, 3, 4, 5 or 6 ligating groups (e.g., donor atoms). In other words, the ligand may be attached to the copper ion of the copper ion complex by 2, 3, 4, 5 or 6 bonds between the copper ion and the ligand of Formula (I) or Formula (II). In some embodiments, the ligand of Formula (VI) may be coordinated to the copper ion of the copper ion complex by 2, 3 or 4 ligating groups. In some embodiments, the copper ion complex comprises a ligand of Formula (I) or Formula (II) or Formula (VI) and a copper ion, wherein the ligand is coordinated to the copper ion by 4 coordinate bonds. In other embodiments, the copper ion complex comprises a ligand of Formula (I) or Formula (II) and a copper ion, wherein the ligand is coordinated to the copper ion by 6 coordinate bonds.

It is likely that the ligating groups of the ligands of Formula (I) or Formula (II) or Formula (VI) are the donor atoms N and/or O. These donor atoms may be present in various functional groups and may be in their charged or uncharged states. For example, the copper ion may bond to the donor atoms N and/or O, which are present in the ligands of Formula (I) or Formula (II) or Formula (VI) in the functional groups —OH, —O⁻, —NH⁻—, —N⁻—, $CO_2H$, $CO_2^-$, =N— or =O (where applicable).

For example, in some embodiments, the copper ion complex may comprise a ligand attached to a copper ion by 4 bonds, as represented by Formula (III) or Formula (IV) as depicted below (where M is a copper ion):

Formula (III)

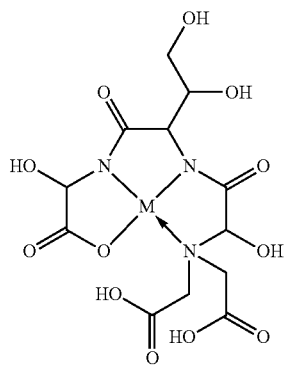

Formula (IV)

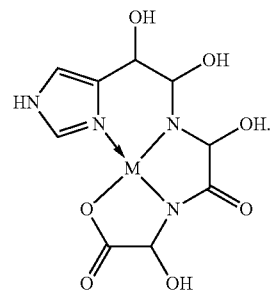

As a person skilled in the art will appreciate, the structures depicted in Formula (III) and Formula (IV) are a generalisation only, as various protonation/deprotonation steps will occur to give rise to tautomers of the structures of Formulas (III) and (IV). For example, the imidazole of Formula (IV) may deprotonate and tautomerise to give a structure of Formula (IVa):

Formula (IVa)

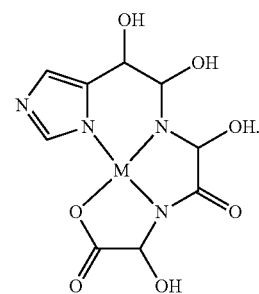

As a person skilled in the art will also appreciate, the ligands may also bind to the copper ion by further coordination bonds. For example, one of the pendant carboxylic acid groups of Formula (III) may also bind to the metal centre to give the structure depicted in Formula (IIIa) below:

Formula (IIIa)

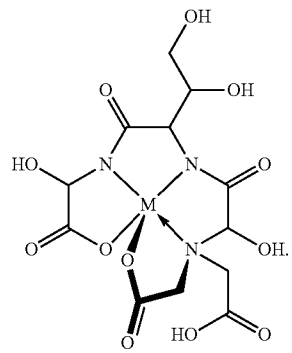

Further coordination may afford the structure depicted in Formula (IIIb):

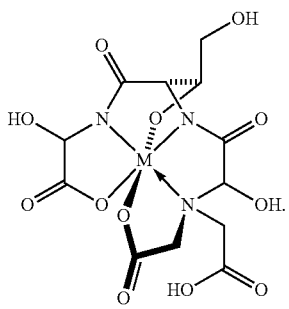

Formula (IIIb)

Without wishing to be bound by theory, it may also be possible for a ligand to coordinate to the copper ion via a contiguous series of 2 or more atoms (i.e., have a hapticity of 2 or more). For example, it may be possible for the ligand of Formula (II) to bind to the copper via the 5 contiguous atoms of the imidazolate group (i.e., hapticity of 5, $\eta^5$), as depicted below in Formula (V).

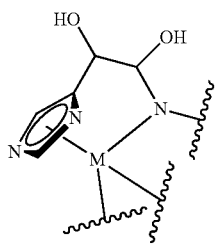

Formula (V)

Accordingly, in some embodiments, the copper ion complex comprises a ligand coordinated to the copper ion via a contiguous series of 2 or more atoms (i.e., having a hapticity of 2 or more), for example, having a hapticity of 2 ($\eta^2$), 3 ($\eta^5$), 4 ($\eta^4$) or 5 ($\eta^5$).

The copper ion complex or mixture of copper ion complexes of the present disclosure (i.e., a copper ion complex or a mixture of copper ion complexes as referred to in the second aspect of the present invention or obtained by the process referred to in the first aspect of the present invention) may, in some embodiments, exist as salts. Such salts are preferably pharmaceutically acceptable, that is, a salt which is not deleterious to a subject to whom the salt is administered. Examples of pharmaceutically acceptable salts include salts of pharmaceutically acceptable cations such as sodium, potassium, lithium, calcium, magnesium, ammonium and alkylammonium; acid addition salts of pharmaceutically acceptable inorganic acids such as hydrochloric, orthophosphoric, sulphuric, phosphoric, nitric, carbonic, boric, sulfamic and hydrobromic acids; or salts of pharmaceutically acceptable organic acids such as acetic, propionic, butyric, tartaric, maleic, hydroxymaleic, fumaric, citric, lactic, mucic, gluconic, benzoic, succinic, oxalic, phenylacetic, methanesulphonic, trihalomethanesulphonic, toluenesulphonic, benzenesulphonic, salicylic, sulphanilic, aspartic, glutamic, edetic, stearic, palmitic, oleic, lauric, pantothenic, tannic, ascorbic and valeric acids. Pharmaceutically acceptable salts may also be formed with amino acids having positively charged side-chains (e.g., arginine, histidine and lysine), negatively charged side-chains (e.g., aspartic acid and glutamic acid), polar uncharged side-chains (e.g., serine, threonine, asparagine and glutamine), hydrophobic side-chains (e.g., alanine, valine, isoleucine, methionine, phenylalanine, tyrosine and tryptophan) or other side-chains (e.g., cysteine, selenocysteine, glycine and proline).

In some embodiments, the copper ion complex or mixture of copper ion complexes of the present disclosure form solvates with water (hydrates) or common organic solvents. Such solvates are contemplated herein.

The copper ion complexes of the present invention may, in certain circumstances or conditions, aggregate to form a supramolecular assembly. Accordingly, in some embodiments, the copper ion complex or mixture of copper ion complexes of the present disclosure exist in a supramolecular assembly (a supramolecular assembly comprising two or more copper ion complexes of the present disclosure and may optionally comprise other copper ion complexes such as copper EDTA). Supramolecular assemblies comprising the copper ion complexes of the present disclosure may be loosely held together (e.g., by Van der Waals, dispersion or electrostatic forces) and disassemble under certain conditions.

The copper ion complexes of the present disclosure may, in certain circumstances or conditions, form a polymer. As used herein, the terms "polymer" and "polymers" are used in a broad sense and include an oligomer, oligomers, oligomeric material and the like, unless the context clearly requires otherwise. That is, the terms "polymer" and "polymers" as used herein include dimers, trimers, tetramers etc. (i.e., comprising 2, 3, 4 etc. monomeric/repeating units or entities). For example, the term "polymer" may be used herein to refer to 2, 3, 4, 20, 50, 100, 1000, 10000, 100000 etc. monomeric/repeating units or entities. Experimental evidence (e.g., mass spectroscopic data, not presented) suggests that material isolated from the process of the present disclosure may, in some circumstances, comprise a polymer formed of copper ion complexes.

In some embodiments, a polymer of a copper ion complex comprising a ligand of Formula (I) or Formula (II) or Formula (VI) may be provided by the polymerisation of a ligand of Formula (I) and/or Formula (II) and/or Formula (VI). A person skilled in the art will understand that the ligands of Formula (I), Formula (II) and Formula (VI) each have functional groups capable of forming covalent bonds (e.g., esters, amides, ethers etc.). Accordingly, polymers may, in various embodiments, be formed by the polymerisation of the functional groups of the ligands of Formula (I) and/or Formula (II) and/or Formula (VI) leading to polyesters, polyamides, polyethers etc. For example, a carboxylic acid group residing on the ligand of Formula (I) may form an ester with an alcohol group (—OH) on a ligand of Formula (I) or Formula (II) or Formula (VI) to form an ester bond.

In some embodiments, a polymer of a copper ion complex comprising a ligand of Formula (I) or Formula (II) or Formula (VI) is a coordination polymer. A coordination polymer may be described as a structure containing copper cations linked by organic ligands. A coordination polymer may also be described as a coordination compound with repeating coordination entities extending in 1, 2 or 3 dimensions, or as a polymer whose monomeric/repeat units are coordination complexes. Coordination polymers may extend along a single dimension (and may include cross-links between two or more individual chains), or may extend in 2 or 3 dimensions. In some embodiments, the coordination polymer comprises a copper cation bound to more than 1 (e.g., 2, 3, 4, 5 or 6) ligands of Formula (I) and/or Formula (II) and/or Formula (VI). In other embodiments, the coordination polymer comprises a ligand of Formula (I) and/or Formula (II) and/or Formula (VI) bound to more than 1 (e.g., 2, 3, 4, 5 or 6) copper cations.

In some embodiments, polymers of copper ion complexes comprising a ligand of Formula (I) and/or Formula (II) and/or Formula (VI) may form during the formation of the complex, or may form during the formation of the ligands. In other words, the copper ion complexes may polymerise during their formation, or the ligands may be polymerised prior to formation of the copper ion complex.

Polymers may be formed solely from copper ion complexes comprising a ligand of Formula (I), copper ion complexes comprising a ligand of Formula (II) or copper ion complexes comprising a ligand of Formula (VI) (i.e., homopolymers). Alternatively, polymers may also be formed from a mixture of copper ion complexes comprising a ligand of Formula (I) and/or copper ion complexes comprising a ligand of Formula (II) and/or copper ion complexes comprising a ligand of Formula (VI) (i.e., copolymers). In some embodiments, the copolymers may also comprise complexes other than copper ion complexes comprising a ligand of Formula (I), Formula (II) or Formula (VI). The copolymers may, for example, be random copolymers, alternating copolymers or block copolymers. In some embodiments, the polymer may comprise copper ion complexes other than those encompassed by Formula (I) and Formula (II) and Formula (VI). For example, the polymer may comprise a copper ion complex comprising a ligand of Formula (I) and/or a copper ion complex comprising a ligand of Formula (II) and/or a copper ion complex comprising a ligand of Formula (VI) and copper EDTA.

In some embodiments, the polymers comprise from 2 to about 20000 monomeric/repeating units/entities, for example, from 2 to about 5000, 1000, 100, 20, 10, 9, 8, 7, 6, 5, 4 or 3 monomeric units. In some embodiments, the process of the present disclosure affords a polymer comprising one or more copper ion complexes of the second aspect of the present invention (which may be the same or different complexes). In some embodiments, this polymer may further comprise other complexes (e.g., copper EDTA).

In some embodiments, the process of the present disclosure provides a mixture comprising one or more of: (i) one or more copper ion complexes of the second aspect of the present invention; (ii) a polymer comprising one or more copper ion complexes referred to in (i); and (iii) a supramolecular assembly comprising one or more copper ion complexes referred to in (i) and/or (ii). Such mixtures may, in some embodiments, further comprise other complexes (e.g., copper EDTA or polymers comprising copper EDTA).

In some embodiments, the process of the present disclosure provides a dimer comprising two copper ion complexes each comprising a ligand of Formula (VI). In some embodiments, the process of the present disclosure provides a dimer comprising one copper ion complex comprising a ligand of Formula (VI) and one other complex (e.g., a copper ion complex comprising a ligand of Formula (I), Formula (II) or Formula (VI) or EDTA).

Examples of dimers that may be present in a mixture of copper ion complexes obtained by the process of the present disclosure include:

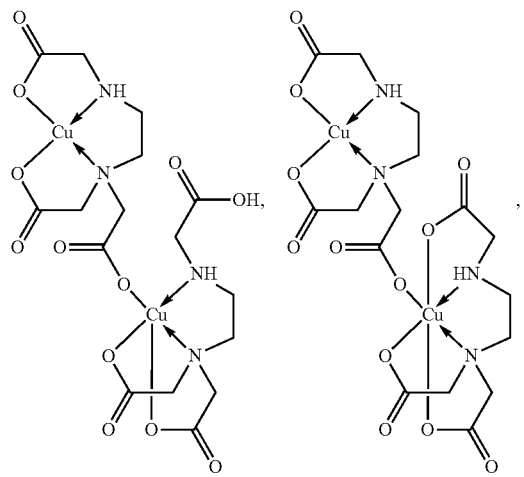

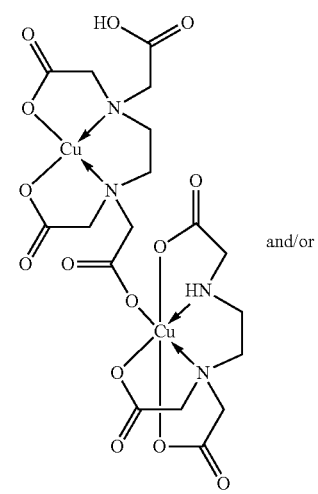

and/or

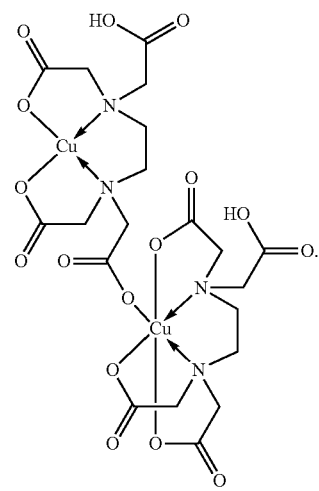

In the exemplary dimers shown above, each appearance of Cu may represent $Cu^{3+}$ or $Cu^{2+}$. For example, the dimers that may be present in a mixture of copper ion complexes obtained by the process of the present disclosure may include:

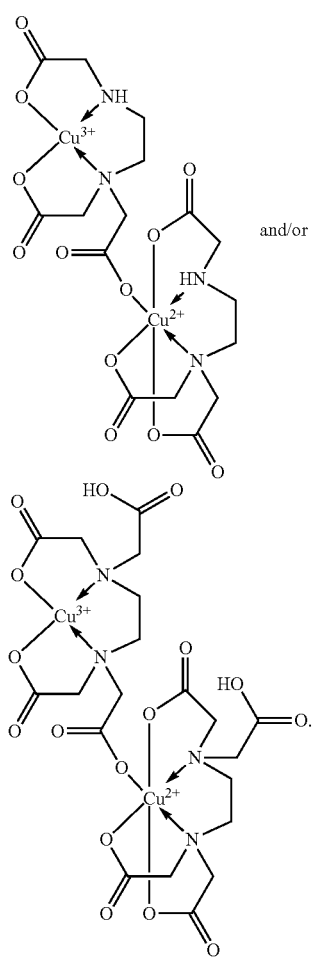

and/or

In some particular embodiments, the process of the present disclosure provides a mixture of copper ion complexes comprising:

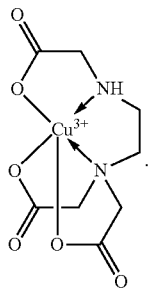

In some embodiments, the process of the present disclosure provides a mixture of copper ion complexes comprising one or more copper ion complexes of the present disclosure and, optionally, one or more polymers comprising a copper ion complex of mixture of copper ion complexes of the present disclosure.

The copper ion complex or mixture of copper ion complexes of the present disclosure (i.e., a copper ion complex or a mixture of copper ion complexes as referred to in the second aspect of the present invention or obtained by the process referred to in the first aspect of the present invention) may, in some embodiments, comprise $Cu^{3+}$, $Cu^{2+}$ or $Cu^+$ ions, or a mixture thereof. In some embodiments, the copper is $Cu^{3+}$, $Cu^{2+}$, or a mixture thereof, especially $Cu^{3+}$. In some embodiments, there exist 2 or more different $Cu^{3+}$ species. In some embodiments, there exist 3 or more different $Cu^{3+}$ species. In some embodiments, the mixture of copper ion complexes comprises a mixture of $Cu^{2+}$ species and $Cu^{3+}$ species. In some embodiments, the ratio of the $Cu^{2+}$:$Cu^{3+}$ species in the mixture of copper ion complexes is in the range of about 1:1 to about 1:5, for example, about 1:2 to about 1:4, 1:3 to about 1:4 or about 1:3.5.

Without wishing to be bound by theory, it is believed that one factor in the observed biological activity of copper ion complexes of the present disclosure may be due to the formation of relatively stable complexes of $Cu^{3+}$. In addition, it is believed that the hyaluronic acid provides an environment that aids the stabilisation of copper ion complexes, particularly those comprising $Cu^{3+}$. It is believed that the observed stabilisation and improved biological activity of copper ion complexes in compositions comprising hyaluronic acid may be due to one or more effects which may act alone or in concert. For example, the hyaluronic acid may act as a buffer, thereby maintaining the composition at a suitable pH (e.g., ideal for the copper ion complexes of the present disclosure) when in contact with the skin (or other surface) of a subject. It is also possible that the hyaluronic acid may coordinate to the copper ion of the copper ion complexes, which may act to stabilise the complexes and may also assist with transporting the complexes to thereby deliver them to the subject (e.g., transportation/absorption into the skin). The hyaluronic acid may also assist with stabilisation and/or transportation of the copper ion complexes by other, presently unknown, mechanisms.

In some embodiments, hyaluronic acid (e.g., sodium hyaluronate) forms a hydrogel which unexpectedly supports the stability of the copper ion complex or mixture of copper ion complexes.

In some embodiments, hyaluronic acid (e.g., sodium hyaluronate) forms a hydrogel which unexpectedly both supports the stability of the copper ion complex or mixture of copper ion complexes and improves the bioavailability/bioactivity of the copper ion complex or mixture of copper ion complexes. The use of sodium hyaluronate in topical formulations as a hydrogel is known, particularly for cosmetic applications where it is typically used for hydration. Hyaluronic acid has also been incorporated into topical formulations for delivery of topical dermatological agents. However, these formulations have traditionally been used to deliver the topical dermatological agents to a localised area to produce a localised effect, typically no deeper than the dermis. The enhancement of the bioavailability/bioactivity of active pharmaceutical ingredients has not, to the best of the inventor's knowledge, been reported.

In some embodiments, the composition of the present invention surprisingly improves the bioavailability/bioactivity of the copper ion complex or mixture of copper ion complexes (relative to the copper ion complex or mixture of copper ion complexes absent the hyaluronic acid). Without wishing to be bound by theory, it is believed that the hyaluronic acid may improve the bioavailability and/or bioactivity of the copper ion complex or mixture of copper ion complexes by affecting the stability, as discussed above, and/or the release rate and/or "penetration" properties. In this regard, "penetration" refers to the amount or ability of the copper ion complex or mixture of copper ion complexes to enter the skin or other surface to which it is applied (e.g., epithelium). As will be appreciated, increased "penetration"

may increase the transportation and/or absorption of the copper ion complex or mixture of copper ion complexes into the skin or other surface to which the composition is applied, thereby improving the bioavailability and/or bioactivity.

In some embodiments, the composition of the present invention is administered topically and surprisingly elicits a pharmacodynamic response outside of the localised area to which it is administered. It is believed that such a result may be due to the improved "penetration" properties described above.

The compositions of the present invention are described primarily in the context of treating humans. However, the compositions of the present invention may also find use in the treatment of non-human animals. The subjects, individuals or patients to be treated for endometriosis, one or more symptoms of endometriosis and/or pain are typically mammalian subjects including but not limited to humans, primates, livestock animals such as sheep, cattle, pigs, horses, donkeys and goats; laboratory test animals such as mice, rats, rabbits and guinea pigs; companion animals such as cats and dogs or captive wild animals such as those kept in zoos. In particular embodiments, the subject is a human. In the context of treating endometriosis, particular subjects are female subjects, especially female humans.

The compositions of the present invention typically comprises a pharmaceutically acceptable carrier. Accordingly, the present invention also provides a pharmaceutical composition comprising a composition of the present invention and a pharmaceutically acceptable carrier.

In some embodiments, the composition of the present invention is formulated as a topical formulation (i.e., a composition suitable for topical administration). The terms "topical" and "topical administration" have more than one meaning in the art. "Topical administration" may be used in the art to describe the application/delivery of an agent to a localised area of the body in order to have a pharmacodynamic effect on that localised area. "Topical administration" may also be used in the art to describe the application/delivery of an agent to a localised area or surface of a body part regardless of the location of the pharmacodynamic effect. As used herein, "topical" and "topical administration" are intended to refer to either or both of these meanings. The compositions of the present invention are typically formulated for topical use. In some embodiments, the composition is intended to be applied to a localised area or surface of a body part (e.g., skin, internal surface of a body or surface of an internal organ) with the intention of having a pharmacodynamic effect on that localised area. In other embodiments, the composition is intended to be applied to a localised area or surface of a body part with the intention of having a pharmacodynamic effect on a part or parts of the body other than that localised area or surface. This is particularly so in the treatment of endometriosis, where the composition may be applied to a part of the body other than where the endometriosis is located (e.g., surface of skin, abdomen, vagina or rectum).

In some embodiments, the composition of the present invention is formulated as a topical hydrogel formulation (i.e., a composition in the form of a hydrogel suitable for topical administration).

Gels are typically dispersions of liquids within solids in which liquid particles are dispersed in the solid medium. Hydrogels are gels in which water is the liquid or a significant portion of the liquid (e.g., more than 30% v/v of the liquid is water). Hydrogels may be jelly-like in consistency, but may also range from being soft to hard hydrogels.

Hydrogels are typically formed from a network of polymer chains, typically hydrophilic polymer chains, and water. The polymer chains that form the network of polymer chains in the hydrogel may be referred to herein as a "hydrogelling agent". In some embodiments, the hydrogel formulations comprise a hydrogelling agent in addition to the hyaluronic acid. In other embodiments, the hyaluronic acid acts as the hydrogelling agent. In other embodiments still, the hydrogel formulation comprises a hydrogelling agent and the hyaluronic acid does not act to any appreciable extent as a hydrogelling agent. Accordingly, in some embodiments, the hydrogel is formed from a network of hyaluronic acid. In other embodiments, the hydrogel is formed from a network of hyaluronic acid and one or more other hydrogelling agents. In still other embodiments, the hydrogel is formed from a network of the other hydrogelling agents. Exemplary hydrogelling agents that may be used as the hydrogelling agent, or in addition to the hyaluronic acid, include aloevera, carrageenan, carbomers, xanthan gum, guar gum and the like.

The liquid phase of the hydrogel may contain, in addition to water, any of the conventional liquid phases or systems conventionally used for hydrogels, and may contain, for example, ethanol, polyols (for example, glycerol, propylene glycol and liquid polyethylene glycol, and the like) and suitable mixtures thereof.

In some embodiments, the copper ion complex or mixture of copper ion complexes form particles, optionally with one or more other components. Such particles may, in some embodiments, be suspended in the hydrogel.

For topical administration the compositions of the present invention may be formulated as ointments, creams, gels, hydrogels, sprayable liquid gel (e.g., gel spray, nasal spray), pessaries, suppositories, lotions, transdermal patches, buccal patches or troches. Ointments and creams may, for example, be formulated with an aqueous or oily base with the addition of suitable thickening, emulsifying and/or gelling agents (e.g., emulsion of oil in water or emulsion of water in oil). Lotions may be formulated with an aqueous or oily base and generally also contain one or more emulsifying agents, stabilising agents, dispersing agents, suspending agents, thickening agents, colouring agents or preservatives (e.g., methyl paraben, propyl paraben, phenoxyethanol). The complexes of the present disclosure are typically lipophobic. As such, ointments, creams, lotions etc. are typically formulated with an aqueous (or at least hydrophilic) base, rather than an oily base (which may be problematic due to solubility). Ointments, creams, lotions and the like may also be formulated to comprise $C_{1-3}$-alkoxylated oils and waxes (e.g., ethoxylated vegetable oils, ethoxylated jojoba oil/wax, ethoxylated lanolin oil, ethoxylated coconut oil, ethoxylated cocoa butter).

Formulations suitable for vaginal administration may be presented as pessaries, tampons, creams, gels, pastes, foams or sprays containing in addition to the active ingredients such carriers as are known in the art to be appropriate. Formulations suitable for rectal administration may be presented as suppositories, creams, gels, pastes, foams or sprays containing in addition to the active ingredients such carriers as are known in the art to be appropriate.

In some embodiments, the composition of the present invention is formulated as a mouthwash. Such embodiments may comprise from about 0.01% w/w to about 30% w/w hyaluronic acid, especially from about 0.1% w/w to about 2% w/w, more especially about 0.5% w/w. In some embodiments, the molecular weight of more than 90% w/w of the hyaluronic acid is in the range of from about $10^5$ to about $10^7$ Da, especially about $10^6$ Da. In some embodiments, the amount of copper ion complex or mixture of copper ion complexes may be in the range of from about 0.01% w/w to about 10% w/w, especially from about 0.5% w/w to about 5% w/w, more especially from about 1% w/w to about 1.5% w/w. Exemplary applications include toothache, pulpitis, root impaction, dentoalveolar abscess, postextraction pain (including dry socket, dentoalveolar trauma or fractures).

In some embodiments, the composition of the present invention is formulated as a gel spray. Such embodiments may comprise from about 0.01% w/w to about 30% w/w hyaluronic acid, especially from about 0.1% w/w to about 2% w/w, more especially about 0.75% w/w. In some embodiments, the molecular weight of more than 90% w/w of the hyaluronic acid is in the range of from about $10^5$ to about $10^7$ Da, especially about $10^6$ Da. In some embodiments, the amount of copper ion complex or mixture of copper ion complexes may be in the range of from about 0.01% w/w to about 30% w/w, especially from about 0.5% w/w to about 5% w/w, more especially from about 1% w/w to about 3% w/w. Exemplary applications include nociceptive pain (e.g., visceral pain (endometriosis, period pain and pain associated with thoracic, pelvic or abdominal viscera), postoperative pain, mechanical lower back pain, sports/exercise injuries, sickle cell crisis, toothache), neuropathic pain (e.g., endometriosis, period pain, trigeminal neuralgia, postherpetic neuralgia, peripheral nerve injury pain, post-surgical pain, post-amputation pain, painful polyneuropathy, painful radiculopathy, neuropathic pain associated with spinal cord injury, diabetes pain, HIV pain, central post-stroke pain, central neuropathic pain associated with multiple sclerosis, chemotherapy induced peripheral neuropathy) and sensory hypersensitivity (e.g., fibromyalgia).

In some embodiments, the composition of the present invention is formulated as a nasal spray. Such embodiments may comprise from about 0.01% w/w to about 30% w/w hyaluronic acid, especially from about 0.1% w/w to about 1% w/w, more especially about 0.25% w/w. In some embodiments, the molecular weight of more than 90% w/w of the hyaluronic acid is in the range of from about $10^5$ to about $10^7$ Da, especially about $10^6$ Da. In some embodiments, the amount of copper ion complex or mixture of copper ion complexes may be in the range of from about 0.01% w/w to about 30% w/w, especially from about 0.5% w/w to about 5% w/w, more especially from about 1% w/w to about 3% w/w. Exemplary applications include pain associated with sinusitis and pain associated with other inflammatory nasal and ear conditions (including otitis media, acute otitis media, otitis media with effusion and chronic suppurative otitis media).

In some embodiments, the composition of the present invention is formulated as a pessary formulation. Such embodiments may comprise from about 30% w/w to about 80% w/w hyaluronic acid, especially from about 40% w/w to about 60% w/w, more especially about 50% w/w. In some embodiments, the molecular weight of more than 90% w/w of the hyaluronic acid is in the range of from about $10^5$ to about $10^7$ Da, especially about $10^6$ Da. In some embodiments, the amount of copper ion complex or mixture of copper ion complexes may be in the range of from about 0.01% w/w to about 30% w/w, especially about 0.5% w/w to about 5% w/w, more especially about 1% w/w to about 3% w/w. In some particular embodiments of the pessary formulation, water soluble components are preferred, as well as, for example, alkoxylated oils and waxes (e.g., suitable components selected from ethoxylated vegetable oils, ethoxylated jojoba oil/wax, ethoxylated lanolin oil, ethoxylated coconut oil, ethoxylated cocoa butter). Exemplary applications include endometriosis and period pain.

In some embodiments, the composition of the present invention is formulated as a suppository formulation. Such embodiments may comprise from about 30% w/w to about 80% w/w hyaluronic acid, especially from about 40% w/w to about 60% w/w, more especially about 50% w/w. In some embodiments, the molecular weight of more than 90% w/w of the hyaluronic acid is in the range of from about $10^5$ to about $10^7$ Da, especially about $10^6$ Da. In some embodiments, the amount of copper ion complex or mixture of copper ion complexes may be in the range of from about 0.01% w/w to about 30% w/w, especially about 0.5% w/w to about 5% w/w, more especially about 1% w/w to about 3% w/w. In some particular embodiments of the suppository formulation, water soluble components are preferred, as well as, for example, alkoxylated oils and waxes (e.g., suitable components selected from ethoxylated vegetable oils, ethoxylated jojoba oil/wax, ethoxylated lanolin oil, ethoxylated coconut oil, ethoxylated cocoa butter). Exemplary applications include endometriosis and period pain.

In some embodiments, the composition of the present invention is formulated as cream. Such embodiments may comprise from about 0.01% w/w to about 30% w/w hyaluronic acid, especially from about 0.1% w/w to about 3% w/w or from about 0.1% w/w to about 2% w/w, more especially about 1% w/w. In some embodiments, the molecular weight of more than 90% w/w of the hyaluronic acid is in the range of from about $10^5$ to about $10^7$ Da, especially about $10^6$ Da. In some embodiments, the amount of copper ion complex or mixture of copper ion complexes may be in the range of from about 0.01% w/w to about 30% w/w, especially about 0.5% w/w to about 5% w/w, more especially about 1% w/w to about 3% w/w. Exemplary applications include pain, for example, nociceptive pain (e.g., visceral pain (endometriosis, period pain and pain associated with thoracic, pelvic or abdominal viscera), postoperative pain, mechanical lower back pain, sports/exercise injuries, sickle cell crisis, toothache), neuropathic pain (e.g., endometriosis, period pain, trigeminal neuralgia, postherpetic neuralgia, peripheral nerve injury pain, post-surgical pain, post-amputation pain, painful polyneuropathy, painful radiculopathy, neuropathic pain associated with spinal cord injury, diabetes pain, HIV pain, central post-stroke pain, central neuropathic pain associated with multiple sclerosis, chemotherapy induced peripheral neuropathy), sensory hypersensitivity (e.g., fibromyalgia), pain associated with sinusitis, pain associated with other inflammatory nasal and ear conditions (including otitis media, acute otitis media, otitis media with effusion and chronic suppurative otitis media), endometriosis and period pain.

In some embodiments, the compositions described herein have utility in the treatment or prevention of fibromyalgia. Currently, there are no existing and effective therapies available for fibromyalgia suffers.

In preparing compositions of the present invention, particularly embodiments that comprise more than about 5 or 10% w/w hyaluronic acid having a molecular weight of about $10^6$ Da or greater, it may be beneficial to prepare the composition by a technique that comprises slowly adding the hyaluronic acid to an alcohol or polyol solvent such as glycol (e.g., glycerine) while stirring to form a well dispersed slurry. This slurry can then be added to the required amount of water whilst stirring with a high shear mixer to form a firm jelly. A similar technique may also be used to make a pastille by using greater proportions of higher MW hyaluronic acid. An alternative technique to prepare a pastille is to first form a jelly as above, pour it into a mould and dry under reduced pressure and/or increased temperature until the required water content is achieved.

In some embodiments, the composition of the present invention is formulated as a transdermal patch. Such a patch is typically self-adhering. In some embodiments, the patch is formulated as a slow release patch (i.e., to slowly release the copper ion complex or mixture of copper ion complexes of the present disclosure and the hyaluronic acid to the surface to which the patch is applied). In some embodiments, the patch has a pharmacodynamic effect on localised area to which it is applied. In some embodiments, the patch has a pharmacodynamic effect on parts of the body other than the localised area or surface to which the patch is applied.

In some embodiments, the composition of the present invention is formulated as a patch suitable for topical insertion during surgery. Such a patch is typically sterile and may optionally be self-adhering. In some embodiments, the patch is formulated as a slow release patch (i.e., to slowly release the copper ion complex or mixture of copper ion complexes of the present disclosure and the hyaluronic acid to the surface to which the patch is applied). In some embodiments, the patch has a pharmacodynamic effect on localised area to which it is applied. In some embodiments, the patch has a pharmacodynamic effect on parts of the body other than the localised area or surface to which the patch is applied.

Other agents may also be added to the formulations of the present invention to provide other desired properties. For example, in some embodiments, humectants, anti-oxidants, vitamins, colouring agents and/or fragrances may be added. Such additives may be natural (for example, plant extracts, animal-derived oils, vitamins), or may be synthetic (for example, surfactants or preservatives such as BHT).

As an example, a formulation for topical administration may comprise (in addition to the copper ion complex or mixture of copper ion complexes of the present disclosure and the hyaluronic acid) any one or more of the following additives: *Simmondsia Chinensis* (Jojoba oil), glyceryl stearate, cetylstearyl alcohol, sodium stearoyl lactylate, stearic acid, glyceryl monostearate, glycerine, caprylic/capric triglyceride, PEG 20, sorbitan monolaurate, cocoa butter, triethanolamine, emu oil, shea butter, tocopheryl acetate (vitamin E), phenoxyethanol, ethylhexylglycerin, polyoxyethylene (20) sorbitan monooleate, acrylates/C10-30 alkyl acrylate crosspolymer, essential oil (e.g., lavender oil), Tween 20 (polyoxyethylene-20-sorbitan monolaurate), glycerine or Euxyl PE 9010 (phenoxyethanol and ethylhexylglyerin).

Formulations suitable for topical administration in the mouth include lozenges that, in addition to comprising the copper ion complex or mixture of copper ion complexes of the present disclosure and the hyaluronic acid, may comprise a flavoured base, usually sucrose, maltitol, acacia or tragacanth; pastilles that, in addition to comprising the copper ion complex or mixture of copper ion complexes of the present disclosure and the hyaluronic acid, may comprise an inert base such as gelatin and glycerin or sucrose and acacia; buccal cavity patches; hydrogels; or gels.

The pharmaceutical compositions of the present invention may additionally or alternatively be suitable for oral, rectal, nasal, buccal, sub-lingual and slow-release dermal patch, vaginal or parenteral (including intramuscular and subcutaneous) administration or in a form suitable for administration by inhalation or insufflation.

The pharmaceutical composition or formulation of the present invention may be placed into the form of a unit dosage. The pharmaceutical composition may be a solid or semi-solid (e.g., hydrogel), such as a pessary or suppository, or a liquid such as a solution, gel, suspension, emulsion, spray or elixir.

Such pharmaceutical compositions and unit dosage forms thereof may comprise conventional ingredients in conventional proportions, with or without additional active compounds or principles, and such unit dosage forms may contain any suitable effective amount of the active ingredients commensurate with the intended daily dosage range to be employed.

For preparing pharmaceutical compositions, pharmaceutically acceptable carriers can be either solid or liquid. A solid carrier can be one or more substances which may also act as diluents, flavouring agents, solubilisers, lubricants, suspending agents, binders or preservatives.

Suitable carriers include magnesium stearate, talc, sugar, lactose, pectin, dextrin, starch, gelatin, tragacanth, a low melting wax, cocoa butter, and the like.

The pharmaceutical compositions of the present invention are preferably stable under the conditions of manufacture and storage and may be preserved against oxidation and the contaminating action of microorganisms such as bacteria or fungi.

Of course, any material used in preparing any pharmaceutical compositions should be pharmaceutically pure and substantially non-toxic in the amounts employed.

In some embodiments, compositions of the present invention may be used in combination with one or more other therapeutically effective agents. Accordingly, in some embodiments, the pharmaceutical composition may further comprise, or be administered in combination with, one or more other agents. It will be understood that the combined administration of a composition of the first or second aspect of the present invention with the one or more other agents may be concurrent, sequential or separate administration.

The compositions and formulations of the present invention are typically formulated or administered to deliver a therapeutically effective amount. The term "effective amount" or "therapeutically effective amount" refers to the amount of a compound that will elicit the biological or medical response in a subject, tissue or cell that is being sought by the veterinarian, medical doctor or other clinician.

It will be understood that the therapeutically effective amount of a copper ion complex (or a mixture of copper ion complexes) and hyaluronic acid (including salts and mixtures thereof) will depend upon a variety of factors including the activity of the specific complex or mixture of complexes employed, the metabolic stability and length of action of that complex, the age, body weight, general health, sex and diet of the subject, the mode and time of administration (e.g., surface area of topical administration), rate of excretion, drug combinations, and the severity of the particular condition.

As discussed above, the exact causes of endometriosis are not fully understood. However, some research suggests a number of possible causes, risk factors and correlations. Some correlations have been reported in relation to some cytokines, genes and gene signalling. Without wishing to be bound by theory, it is believed that there are a number of cytokines, genes and gene signalling pathways that are affected by, or implicated in, endometriosis. Table 1 below shows a selection of cytokines, genes and gene signalling pathways that are reported to be up-regulated or down-regulated in subjects with endometriosis.

TABLE 1

| UP-REGULATED IN ENDOMETRIOSIS | DOWN-REGULATED IN ENDOMETRIOSIS |
|---|---|
| CXCL12-CXCR4 | HMOX-1 (also referred to as HO-1) |
| VEGF-A | Notch signalling (associated with FOXO1) |
| Wnt-signalling | HES5 signalling |
| p53 signalling (associated with FAS) | |
| ID1 signalling | |
| CCL2 | |
| IL-6 | |
| BCL-2 | |
| PDGF-AA | |

Additionally, some studies have suggested that a relatively small number of pro-inflammatory cytokines and genes and gene signalling pathways modulate the formation and maintenance of the three main forms of endometriosis—uterine, bladder and bowel.

In addition, it is believed that decreased Notch signalling is associated with endometriosis and contributes to impaired decidualization through the down-regulation of FOXO1. FOXO1 acts as a downstream target of Notch signalling and endometriosis has reportedly been associated with decreased expression of NOTCH1-regulated, FOXO1-responsive genes during decidualization.

Advantageously, the compositions of the present invention may, in at least preferred embodiments, modulate the up-regulation of one or more of CXCL12-CXCR4, VEGF-A, Wnt-5a signalling, p53 signalling, ID1 signalling, CCL2, IL-6, BCL-2 and PDGF-AA; and/or modulate the down-regulation of one or more of HMOX-1, Notch signalling and HES5 signalling. It is noted that CXCL12 was formerly known as SDF-1 or Stromal Derived Factor-1; and CCL2 was formerly known as Monocyte Chemoattractant Protein-1). Without wishing to be bound by theory, it is believed that such properties render the compositions useful for the treatment or prevention of endometriosis.

Accordingly, the present invention provides compositions according to the first or second aspect that may be useful in the treatment or prevention of endometriosis in a subject. In some embodiments, the treatment of endometriosis is in a subject with endometriosis and/or endometriosis symptoms. In some embodiments, the prevention of endometriosis is in a subject prone to developing endometriosis (including wherein the subject has been recognised as such and also including wherein the subject has not been recognised as such).

The term "prevention" (and variants thereof, including "prevent", "preventing" etc.) as used herein, is to be considered in its broadest context. The term "prevention" does not necessarily imply that a subject does not or will not develop the condition (endometriosis, one or more symptoms of endometriosis and/or pain). Accordingly, prevention includes delaying the onset of the condition in a subject. Prevention may also include administration (before the onset of the condition) that reduces the severity and/or duration of the condition. The term "prevention" may also be used in the context of preventing the severity of the condition from increasing or transitioning (e.g., acute pain becoming chronic pain). Accordingly, in some embodiments, the prevention of pain includes the prevention of acute pain transitioning to chronic pain.

Reference herein to a "subject prone to developing endometriosis"e is intended to refer to a subject at higher risk of developing endometriosis compared to the general population. Subjects prone to developing endometriosis include subjects possessing known risk factors, for example, subjects with retrograde menstruation, abnormal immune responses and a genetic history of endometriosis (e.g., female subjects whose mother and/or sister(s) have endometriosis are at higher risk of developing endometriosis than the general population).

In some particular embodiments related to the treatment or prevention of endometriosis, the composition of the present invention is in the form of a topical formulation, especially a pessary, suppository or a sprayable liquid gel formulation. In some embodiments, the pessary formulation, suppository formulation or sprayable liquid gel formulation also provides pain relief. In some embodiments, the sprayable liquid gel is applied to the lower abdomen. In some particular embodiments wherein the subject experiences pain (e.g., period pain or endometriosis related pain), the composition, especially a sprayable liquid gel formulation, may be applied to the location of the pain, which may advantageously treat the pain as well as treat or prevent endometriosis.

In some embodiments, the compositions of the present invention may be topically applied periodically, for example, half hourly, hourly, 1, 2, 3, 4, 5, 6, 7 or 8 times per 1, 2, 3, 4, 5, 6 or 7 days, weekly or monthly. In some embodiments, the application is at regular intervals. In some embodiments, the application is at irregular intervals. In some embodiments, the application is at regular and irregular intervals (e.g., twice daily on one or more random days of a week). In some embodiments, the application frequency tapers off (e.g., applied hourly initially, tapering off to 4 or 5 times per day after about 1 day). In some embodiments, the periodic application treats period pain. In some embodiments, the periodic application prevents endometriosis. In some embodiments, the periodic application both treats period pain and prevents endometriosis. Without wishing to be bound by theory, it is believed that the composition may act as an analgesic and/or anti-inflammatory. It is further believed that suppressing the inflammatory response on a regular basis, including modulating implicated cytokines and gene signalling pathways, prevents endometriosis.

The compositions of the first and second aspect of the present invention may be useful in the treatment or prevention of one or more symptoms of endometriosis.

In some embodiments, the one or more symptoms of endometriosis include pain (including painful periods, painful ovulation, chronic pelvic pain and pain during or after sexual intercourse), heavy bleeding, fatigue and infertility.

In some particular embodiments, the compositions of the first and second aspect of the present invention may be useful in the treatment or prevention of pain associated with endometriosis.

While the exact causes of pain associated with endometriosis are not well known, nerves including nerves in the peripheral and central nervous system have been implicated (see, Siqura de Sousa et al. *Clin Anat* 28, 1029-1038) and perineural (along a nerve) spread of endometriosis was supported. In the peripheral nervous system, the lumbosacral and sacral plexuses and sciatic nerves were most commonly affected in endometriosis patients with initial cyclic, catamenial radiating pain that gradually increased to become constant with variable response to hormonal treatment. In some cases weakness and sensory loss were reported. Siqura de Sousa has postulated three possible explanations for nerve involvement in endometriosis and the pain experienced by patients.

Neurotropism, where neurotropic nerve fibres are present in high density in endometriotic lesions and also found in the eutopic endometrium of endometriosis patients allowing perineural spread from the endometrium. Endometriosis lesions express nerve growth factor (NGF) and pelvic nerves express its receptor (Trk-A) resulting in endometriosis adhesion and nerve proliferation, clinically causing hyperalgesia and pain. NGF may also increase the number of sensory neurons and induce degranulation of mast cells thereby aggravating pain. Hyperalgesia is a primary symptom of neurotropism and the following cytokines, genes and gene signalling pathways have been implicated in the modulation (up/down regulation) and subsequent formation and maintenance of hyperalgesia:

Up-regulation of CXCL12-CXCR4 cytokine-receptor axis;
Up-regulation of the IL-6 cytokine;
Up-regulation of the CCL2 (MCP-1) cytokine;
Up-regulation of VEGF-A cytokine;
Up-regulation of Wnt-5a gene and signalling;
Down-regulation of the HMOX-1/HO-1 gene and gene signalling pathway; and
Down-regulation of Notch signalling pathway.

Angiogenesis, where nerves further promote endometriosis growth and intra-neural invasion by releasing angiogenic factors such as neuropeptide Y (NPY) and vasoactive intestinal polypeptide (VIP). The following cytokines, genes and gene signalling pathways have been implicated in the modulation (up/down regulation) of angiogenesis:

Up-regulation of the VEGF-A cytokine;
Up-regulation of the CXCL12 cytokine;
Up-regulation of the Wnt-5a gene and gene signalling pathway;
Up-regulation of the ID1 gene and gene signalling pathway; and
Suppression of the NOTCH signalling pathway.

A local inflammatory environment, where local inflammation and estrogen further promote endometriosis survival and growth. Angiogenesis is causative in local inflammatory theory, with estrogen rather than nerves being an antagonist. All of the comments in 2 above are equally appropriate here.

Siqura de Sousa et al. also postulated that endometriosis can spread in a similar manner as has been described for pelvic cancer, from the uterus to the lumbosacral plexus (LSP) along the pelvic autonomic nerves and then further into the periphery along the arborizing nerves or proximally to the spinal nerves or even intradurally.

In addition, Notch signalling is down-regulated in both endometriosis and angiogenesis. Accordingly, up-regulation of Notch signalling is believed to be advantageous in the treatment or prevention of both endometriosis and angiogenesis.

Without wishing to be bound by theory, it is believed that the compositions of the present invention may, in at least preferred embodiments, suppress (or modulate the up-regulation) one or more of the CXCL12-CXCR4 cytokine-receptor axis, IL-6 cytokine, CCL2 cytokine, VEGF-A cytokine, Wnt-5a gene and/or gene signalling pathway, Notch signalling pathway, CXCL12 cytokine, the ID1 gene and/or gene signalling pathway; and/or up-regulate (or modulate the down-regulation) the HMOX-1 (HO-1) gene and/or gene signalling pathway; thereby rendering such compositions useful in one or more of the modulation of hyperalgesia, angiogenesis and/or inflammation as discussed at 1, 2 and 3 above. Accordingly, the compositions of the present invention may, in at least preferred embodiments, be useful in the treatment of pain associated with endometriosis.

The compositions of the first and second aspect of present invention may be useful in the treatment or prevention of pain. In some embodiments, the pain is pain associated with endometriosis, as discussed above. In other embodiments, the pain is pain that is not necessarily associated with endometriosis.

There are many types of pain, including, but not limited to, lightning pains, phantom pains, shooting pains, acute pain, nociceptive pain, inflammatory pain, neuropathic pain, complex regional pain, neuralgia, neuropathy, and the like (Dorland's Illustrated Medical Dictionary, $28^{th}$ Edition, W. B. Saunders Company, Philadelphia, Pa.). The goal of treatment of pain is to reduce the degree of severity of pain perceived by a treatment subject.

In some embodiments, the pain is nociceptive pain. The term "nociceptive pain" refers to the normal, acute pain sensation evoked by activation of nociceptors located in non-damaged skin, viscera and other organs in the absence of sensitization.

In some embodiments, the pain is neuropathic pain. By "neuropathic pain" is meant any pain syndrome initiated or caused by a primary lesion or dysfunction in the peripheral or central nervous system. Examples of neuropathic pain include, but are not limited to, thermal or mechanical hyperalgesia, thermal or mechanical allodynia, diabetic pain, entrapment pain, and the like.

In some embodiments, the pain is a complex regional pain syndrome. By "complex regional pain syndromes" is meant the pain that includes, but is not limited to, reflex sympathetic dystrophy, causalgia, sympathetically maintained pain, and the like.

In some embodiments, the pain comprises allodynia. The term "allodynia" as used herein refers to the pain that results from a non-noxious stimulus i.e., pain due to a stimulus that does not normally provoke pain. Examples of allodynia include, but are not limited to, cold allodynia, tactile allodynia (pain due to light pressure or touch), and the like.

In some embodiments, the pain comprises causalgia. The term "causalgia" as used herein refers to the burning pain, allodynia, and hyperpathia after a traumatic nerve lesion, often combined with vasomotor and sudomotor dysfunction and later trophic changes.

In some embodiments, the pain comprises hyperalgesia. By "hyperalgesia" is meant an increased response to a stimulus that is normally painful. A hyperalgesia condition is one that is associated with pain caused by a stimulus that is not normally painful.

In some embodiments, the pain is inflammatory pain. As used herein "inflammatory pain" refers to pain induced by inflammation. Such types of pain may be acute or chronic and can be due to any number of conditions characterized by inflammation including, without limitation, burns including chemical, frictional or thermal burns, autoimmune diseases such as rheumatoid arthritis, osteoarthritis and inflammatory bowel disease including Crohn's disease and colitis, as well as other inflammatory diseases including carditis, dermatitis, myositis, neuritis and collagen vascular diseases.

In some embodiments, the pain is dental pain. The term "dental pain" refers to pain associated with teeth and/or the jaw. Such types of pain may be acute or chronic and can be due to any number of conditions, including, for example, trauma/traumatic injury, loose teeth (e.g., in the process of losing deciduous teeth), tooth decay, damaged or loose filing, wear (e.g., tooth damaged by the grinding of teeth). Dental pain may also include toothache, pulpitis, root impaction, dentoalveolar abscess, postextraction pain (including dry socket, dentoalveola or fractures). Dental pain may also be categorized as one or more of the types of pain described above.

In some embodiments, the pain is a pain state selected from the group consisting of musculo-skeletal pain (including lower back, neck and joint pain), pain associated with impact injury (e.g., alleviating the pain from the impact itself (typically related to nerve damage and inflammation), as well as reducing or inhibiting bruising which may be the source of further pain). In some embodiments, the pain is a "deep seated pain". A "deep seated pain" may be described as a pain located deep in the body which a subject may describe as an "unreachable" pain, for example, pain resulting from tendon damage (e.g., torn anterior cruciate ligament, lower back pain, bone pain). A "deep seated pain" may also be described as a pain that is seemingly unresponsive to conventional pain medications (such as paracetamol or ibuprofen).

As discussed above, pain associated with endometriosis is a common symptom of endometriosis and pain associated with endometriosis may be caused by a number of mechanisms. Some of these mechanisms are also prevalent in pain that is not associated with endometriosis.

In some embodiments, the composition does not act as a local anaesthetic, but rather blocks the feeling of pain without any of the numbness typically associated with local anaesthetics.

Various pain states have been reported to be linked to one or more of the CXCL12-CXCR4 axis, HMOX-1, IL-6, CCL2, Notch signalling pathway, Wnt-signalling pathway and/or VEGF-A, as discussed below.

The CXCL12-CXCR4 axis (including the cytokine ligand (CXCL12), its receptor (CXCR4) and signalling between them (axis)) has recently been implicated in a variety of pain states, including persistent neuropathic pain, chronic inflammatory pain, induced persistent spontaneous pain (including primary mechanical and thermal hypersensitivity), peripheral inflammatory pain, development and maintenance of chronic spontaneous pain and hyperexcitability, initiation and maintenance of neuropathic pain in conditions including diabetic neuropathy, bone cancer pain and HIV-1 pain. It has also been reported that CXCL12-CXCR4 signalling mediates the transition from acute to chronic pain and contributes to both the development and maintenance of a chronic pain state. Without wishing to be bound by theory, it is believed that modulating the CXCL12-CXCR4 signalling axis may be a useful therapeutic approach for the treatment of pain, especially persistent neuropathic pain. It has also been reported that the transition from acute to chronic pain may be prevented by administration, during the acute pain stage, of a therapeutic agent that modulates the CXCL12-CXCR4 axis.

In recent studies it has been shown that alleviation of neuropathic pain can be achieved through spinal glial de-activation using exogenous induction of the HMOX-1 gene and its inducible enzyme HO-1. Other recent studies have also shown that HO-1 has anti-nociceptive activity in both acute and chronic inflammatory pain, where peripheral HO-1 up-regulation reduces induced inflammatory pain. Furthermore, activation of HO-1 using hemin, a selective HO activator, has been shown to prevent sciatic nerve chronic constriction injury-induced neuropathic pain, and to also reduce pro-inflammatory cytokine expression in the spinal cord. Up-regulation of HO-1 has also been shown to elicit potent analgesia against neuropathic pain, partly attributable to inhibition of spinal microglia activation.

The IL-6 gene encodes Interleukin-6, a small glycoprotein that can act both as an inflammatory cytokine and as an anti-inflammatory myokine and together modulate the proximal cellular and chemical responses to injury. The cytokine form has been shown to play a central role in neuronal reaction to nerve injury, with a specific involvement in the process of pathological pain. Other pro-inflammatory cytokines, including TNF-α and IL-β have also been implicated in the development and the creation of persistent chronic pain states. It has been reported that IL-6 up-regulation has been positively correlated to the pain intensity reported by patients and it has also been found that in a case controlled study, IL-6 gene expression was significantly up regulated in skin biopsies of affected skin taken from patients with painful peripheral neuropathy. In a review of the role of IL-6 in nociception and pain, it was shown that in experimental pain states, IL-6, its receptor gp80, and its trans-membranous signal transducer gp130 were all up-regulated in the spinal cord, DRG and peripheral nerves. This review also reported that: (1) IL-6 modulates a number of extracellular and intracellular mediators that are known to be active during pain; (2) IL-6 alters animal responses to pain associated with both mechanical and thermal stimuli; and (3) pain perception can be altered by neutralizing IL-6 or affecting changes in the IL-6 pathway.

CCL2 is an important chemokine involved in the regulation of migration and infiltration of monocytes and macrophages and has been reported, along with its receptor CCR2, to play an important role in neuropathic pain. Reports in the literature also suggest that either/both blocking CCL2/CCR2 signalling and inhibiting the JNK/CCL2 pathway may provide new approaches to treatment of neuropathic pain.

Notch signalling is an evolutionarily conserved pathway, which has been shown to be important for both its role in inflammation and in synaptic plasticity in the central nervous system. It has recently been reported that notch signalling plays a role in both the development and maintenance of neuropathic pain. Further, it has been reported that inhibition of the notch signalling pathway prior to the appearance of pain sensitivity prevented mechanical allodynia induction in a rat model; and that in the same rat model, inhibition of the notch signalling pathway post appearance of pain sensitivity development, reversed the mechanical allodynia of neuropathic pain (both anti-nociceptive effects).

The Wnt-signalling pathway is an evolutionarily conserved pathway that regulates important features of embryonic development, including cell fate determination, neural patterning, organogenesis, cell migration and cell polarity. A recent review, focusing on emerging targets for treatment of neuropathic pain identified the Wnt-pathway as one of the newer and potentially significant therapeutic targets in neuropathic pain given its established role in the promotion of spinal cord neuro-inflammation and chronic pain. Chronic pain, including neuropathic pain caused by cancer and its treatment with chemotherapeutic agents, has been shown to result from neuro-inflammation in the spinal cord, including the DRG. It has also been reported that, in a rodent model, Wnt-signalling directly regulates neuro-inflammation, promoting neuropathic pain. In this model, nerve injury and bone cancer caused rapid and long-lasting Wnt-up-regulation and activation of the Wnt-frizzled-β-catenin signalling. It was further reported that spinal application of inhibitors of Wnt-signalling (the Wnt-production inhibitor IWP-2 and Wnt-scavenger FZD8-Fc) alleviated the development and maintenance of both neuropathic and cancer pain and blocked nerve injury induced neuro-inflammation in the spinal cord.

Vascular Endothelial Growth Factor (VEGF) is a dimeric glycoprotein which plays a central role in angiogenesis. Angiogenesis resulting from VEGF signalling has been shown to have a pivotal role in neuro-inflammation and in inflammation in general, with a recent mouse study concluding that VEGF-A's related components may be causative in peripheral neuropathic pain. It has also been reported that both tactile allodynia and thermal hyperalgesia caused by partial sciatic nerve ligation could be prevented with perineural administration of pharmacological inhibitors of VEGF-A and VEGF-R tyrosine kinases. It was also reported that both mRNA and cytokine expression of VEGF-A were up-regulated in the sciatic nerve post partial sciatic nerve ligation.

Without wishing to be bound by theory, it is believed that the compositions of the present invention may, in at least preferred embodiments, down-regulate (and therefore modulate) one or more of the CXCL12 (ligand), CXCR4 (receptor) and/or the CXCL12-CXCR4 axis, IL-6, CCL2, Notch signalling pathway, Wnt-signalling pathway and VEGF-A; and/or up-regulate (and therefore modulate) HMOX-1, thereby rendering such compositions useful in the treatment of pain.

Methods of treating or preventing endometriosis, one or more symptoms of endometriosis and/or pain are also provided.

Also provided are the use of the components:
(i) hyaluronic acid, a salt of a hyaluronic acid or a mixture thereof; and
(ii) a copper ion complex or mixture of copper ion complexes of the present disclosure,
in the manufacture of a medicament for the treatment or prevention of endometriosis, one or more symptoms of endometriosis and/or pain.

Uses in treating or preventing endometriosis, symptoms of endometriosis and/or pain are also provided.

In an aspect, the present invention provides a method of up-regulating one or more of HMOX-1 (HO-1) gene, HMOX-1 gene signalling pathway, Notch signalling pathway, HES5 signalling pathway and FGF2 in a subject, the method comprising administering a composition according to the first or second aspect to the subject.

In an aspect, the present invention provides a method of down-regulating one or more of CXCL12-CXCR4 cytokine-receptor axis, CXCL12 cytokine, VEGF-A, Wnt-5a gene, Wnt-5a gene signalling pathway, p53 signalling pathway, ID1 gene, ID1 signalling pathway, CCL2, IL-6, BCL-2, PDGF-AA and STAT-1 in a subject, the method comprising administering a composition according to the first or second aspect to the subject.

In an aspect, the present invention provides the use of a composition according to the first or second aspect for the up-regulation of one or more of HMOX-1 (HO-1) gene, HMOX-1 gene signalling pathway, Notch signalling pathway, HES5 signalling pathway and FGF2.

In an aspect, the present invention provides the use of a composition according to the first or second aspect for the down-regulation of one or more of CXCL12-CXCR4 cytokine-receptor axis, CXCL12 cytokine, VEGF-A, Wnt-5a gene, Wnt-5a gene signalling pathway, p53 signalling pathway, ID1 gene, ID1 signalling pathway, CCL2, IL-6, BCL-2, PDGF-AA and STAT-1.

EXAMPLES

The present invention is further described below by reference to the following non-limiting Examples.

Materials
Copper turnings: Sigma-Aldrich Pty Ltd, 12 Anella Avenue, Castle Hill, NSW 2154 Australia.
$H_2O_2$: Redox Pty Ltd, 2 Swettenham Road Minto New South Wales 2566 Australia.
Disodium EDTA: Redox Pty Ltd, 2 Swettenham Road Minto New South Wales 2566 Australia.

The copper used in the following Examples has a density (i.e. density of the individual metal pieces) of about 8.9 $g/cm^3$. Both "freshly settled" and "tapped" bulk densities may be determined for the copper particles/pieces. For the Examples employing copper wire, there was no significant difference between the "freshly settled" and "tapped" bulk densities. The bulk densities specified below refer to the "tapped" bulk density.

Example 1

Quantities

| Cu (fine wire) | 100 g (bulk density = 1 $g/cm^3$) |
| --- | --- |
| $H_2O_2$ (50 wt. %, aq.) | 200 g |
| EDTA-$Na_2$ | 200.0 g |
| $H_2O$ | 800.0 g |

Method
Place the Cu fine wire in a 500 ml Pyrex beaker.
Add the EDTA powder to the beaker on top of the Cu fine wire.
Add the water to the beaker.
Add the $H_2O_2$ to the beaker and swirl to mix.

Results
Ambient temperatures were in the vicinity of 25° C.-30° C. During the reaction the reaction mixture got very hot. The reaction vessel was placed into a controlled temperature water bath at 35° C.
After 11 hours the reaction mixture reached a critical point and an exothermic reaction rapidly ensued and "boiled" over.
Of the 100.0 g of Cu starting material, 69.0 g remained unreacted leading to the conclusion that 31.0 g was complexed. Equivalent of 31.0 g/L Cu.

Example 2

Quantities

| Cu (fine wire) | 1061.6 g (bulk density = 1.5 $g/cm^3$) |
| --- | --- |
| $H_2O_2$ (50 wt. %, aq.) | 700.6 g |
| EDTA-$Na_2$ | 1167.7 g |
| $H_2O$ | 2070.1 g |

Method
Place the Cu fine wire in an oven and heat to approx. 80° C.
Add the EDTA powder to the beaker on top of the Cu fine wire.
Add the hot (approx. 85° C.) water to the beaker.
Add the $H_2O_2$ to the beaker and swirl to mix.
Keep reaction mixture at approx. 85° C. without further agitation.

Results
The reaction went to completion, ending with a strongly exothermic reaction.

Of the 1061.6 g of Cu starting material, 720.0 g remained unreacted leading to the conclusion that 341.6 g was complexed. Equivalent of 47.98 g/L Cu.

Example 3

RM191A Activity

"RM191A" is a mixture of copper ion complexes obtained by a process similar to that described in Examples 1 and 2. After the reaction had proceeded to completion, the reaction mixture was allowed to settle overnight and the supernatant decanted. The supernatant, labelled "RM191A", was a blue/green liquid with a solids content of approximately 42%.

The exact composition of RM191A has not yet been elucidated despite significant efforts in this regard. Data collected to date suggests RM191A comprises a complex mixture of copper ion complexes. Analysis of data collected in respect of samples obtained from processes similar to those described in Examples 1 and 2 suggest at least some of the copper ion complexes have the structure described in the second aspect of the present invention. Data collected to date also suggests the mixture of copper ion complexes comprises a mixture of $Cu^{2+}$ and $Cu^{3+}$ ions. Other data also suggests the formation of polymers (including oligomers) of copper ion complexes and/or the formation of supramolecular structures.

RM191A is a complex (i.e. complicated) mixture of copper ion complexes. It is believed that the mixture includes one or more copper ion complexes comprising a ligand of Formula (I), Formula(II) and/or Formula (VI) and/or one or more polymers as described above. It is believed that the mixture comprises, in addition to other complexes, one or more or all of:

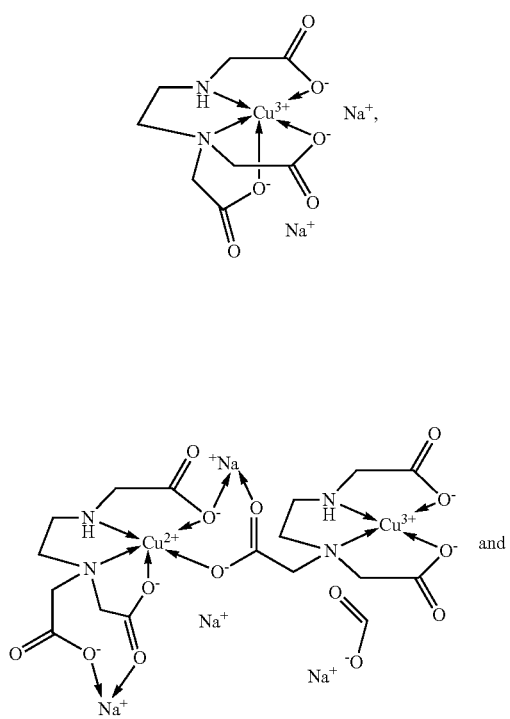

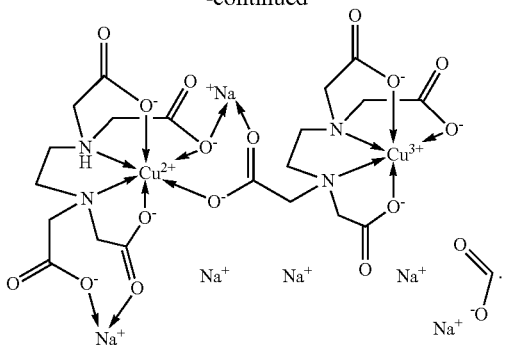

RM191A was found to be unstable on contact with some surfaces (e.g., "soda glass" and some plastics).

A portion of RM191A was used to prepare formulations as described in Examples 4 and 5.

A portion of RM191A was diluted with water and subjected to various assays to assess its biological activity. Results of a cytokine analysis and a gene/gene signalling pathway analysis are presented below.

Cytokine Analysis

The cytokine analysis of RM191A was performed using human fibroblast cell-culture and a Human Cytokine 65-Plex Discovery Assay and was performed by Eve Technologies, Canada. The fold change expressed is a derived number, calculated as the pg/mL of cytokine expressed by sample treated with RM191A vs Control—a positive number represents the fold-up-regulation of the cytokine, a negative number represents the fold-down-regulation of the cytokine. The results of this analysis are summarised in Table 2 below.

TABLE 2

| CYTOKINE | FOLD REGULATION |
| --- | --- |
| FGF-2 | −13.65 |
| PDGF-AA | −8.27 |
| IL-6 | −19.44 |
| CCL2/MCP-1 | −29.77 |
| CXCL12 | −598.57 |
| VEGF-A | −750.00 |

Gene/Gene Signalling Pathway Analysis

The gene/gene pathway analysis of RM191A was performed using human fibroblast cell-culture and $RT^2$ Profiler PCR Array at the Faculty of Medicine and Health Sciences, Centre for Neuroinflammation, Macquarie University. These Arrays are highly reliable and sensitive gene expression profiling tools for analyzing focused panels of genes in signal transduction, biological processes or disease research pathways using real-time PCR. Each catalogued $RT^2$ Profiler PCR Array contains a list of the pathway-focused genes as well as five housekeeping (reference) genes on the array. In addition, each array contains a panel of proprietary controls to monitor genomic DNA contamination (GDC) as well as the first strand synthesis (RTC) and real-time PCR efficiency (PPC). The qPCR Assays used in PCR Arrays are laboratory-verified and optimized to work under standard conditions enabling a large number of genes to be assayed simultaneously. In this study of RM191A, 96 genes were profiled on 3 samples with the PAHS-014Z. The results of this analysis are summarised in Table 3 below.

TABLE 3

| Gene Symbol | Fold Regulation |
|---|---|
| HES5 | 19.81 |
| HMOX1 | 12.68 |
| FAS | −163.83 |
| WNT-5A | −105.13 |
| ID1 | −70.04 |
| BCL2 | −16.51 |
| STAT1 | −16.48 |
| VEGFA | −4.51 |
| NOTCH1 | −3.62 |

Table 3 above refers to the "Fold Regulation". Fold-Regulation represents fold-change results in a biologically meaningful way. Fold-change (2^(-Delta Delta CT)) is the normalized expression (2^(-Delta CT)) in the Test Sample divided the normalized expression (2^(-Delta CT)) in the Control Sample. Fold-change values greater than one indicate a positive- or an up-regulation, and the fold-regulation is equal to the fold-change. Fold-change values less than one indicate a negative or down-regulation, and the fold-regulation is the negative inverse of the fold-change.

Discussion of Results in Tables 2 and 3

RM191A was found to down-regulate CXCL12/CXCR4 by 599 fold. As discussed above, it is believed that blocking or down-regulating the CXCL12/CXCR4 axis and/or the cytokine may be therapeutic in the treatment of endometriosis, not just through reduction of proliferation, migration, and invasion of endometriotic cells, but through inhibition of neovascularization or angiogenesis and survival of lesions and modulation of hyperalgesia.

RM191A was found to up-regulate the HMOX-1 by 13 fold. As discussed above, it is believed that such anti-hypoxia gene regulation is associated with advantageous outcomes in the presence of hypoxia-related disease conditions such as endometriosis. Published literature suggest that hypoxia and angiogenesis may have an active role in the development of endometriosis. Up-regulation of HMOX-1 is also implicated in the modulation of hyperalgesia.

RM191A was found to down-regulate IL-6 by 19 fold. As discussed above, it is believed that downregulation or suppression of IL-6 is implicated in the modulation of hyperalgesia.

RM191A was found to down-regulate MCP-1 by 30 fold. As discussed above, it is believed that downregulation or suppression of MCP-1 is implicated in the modulation of hyperalgesia.

RM191A was found to down-regulate VEGF-A by 750 fold. As discussed above, it is believed that downregulation or suppression of VEGF-A is implicated in modulation and maintenance of angiogenesis in endometriosis.

RM191A was found to down-regulate Wnt-5a by 105 fold. As discussed above, it is believed that downregulation or suppression of Wnt-5a gene or gene signalling is implicated in the modulation of hyperalgesia.

RM191A was found to down-regulate ID-1 by 70 fold. As discussed above, it is believed that downregulation or suppression of ID-1 gene or gene signalling pathway is implicated in the modulation of angiogenesis in endometriosis.

In relation to pain, pro-inflammatory cytokines (such as CXCL12, IL-6, CCL2, Interleukin-1 (IL-1), IL-12, IL-18, interferon gamma (INF-gamma) and tumor necrosis factor (TNF)) are potent mediators of numerous biological processes and are tightly regulated in the body. Chronic uncontrolled levels of such cytokines can initiate and derive many pathologies, including incidences of pain—both nociceptive and neuropathic and a raft of other degenerative inflammatory conditions. Therapies that regulate the activity of inflammatory cytokines, either by supplementation of anti-inflammatory cytokines or by neutralizing pro-inflammatory cytokines by using blocking therapies, have previously been used. Without wishing to be bound by theory, it is believed that RM191A may neutralize pro-inflammatory cytokines and/or supplement anti-inflammatory cytokines.

Vascular Endothelial Growth Factor (VEGF) and Wnt-signalling are believed to facilitate neuropathic pain signalling and angiogenesis in endometriosis. CXCL12 and CXCR4 signalling are believed to facilitate neuropathic pain signalling. CCL2 and Interleukin 6 (IL-6) are pro-inflammatory cytokines believed to facilitate chronic and acute pain signalling. RM191A was shown to down-regulate VEGF-A (-750), CXCL12 (-599), CCL2 (-30) and IL6 (-19).

FGF2 (also referred to as the basic fibroblast growth factor) and STAT signalling are believed to facilitate wound healing by stimulating skin, tissue, muscle and neuron regrowth. Such regrowth may be useful in the treatment of endometriosis or pain associated with endometriosis. RM191A was shown to up-regulate FGF2 and down-regulate STAT-1.

These results demonstrate the usefulness of the RM191A compounds in the modulation of various cytokines, genes and/or gene signalling pathways associated with one or more of endometriosis, symptoms of endometriosis and/or pain. Furthermore, given the improved biological activities shown in relation to the formulations comprising hyaluronic acid (e.g. as demonstrated in Example 5), it is expected that compositions comprising hyaluronic acid and a copper ion complex or mixture of copper ion complexes of the present disclosure will similarly exhibit advantageous properties such as improved biological activity in one or more of: the treatment of endometriosis; the prevention of endometriosis; the treatment of one or more symptoms of endometriosis; the prevention of one or more symptoms of endometriosis; the treatment of pain; and the prevention of pain.

Example 4

Pharmaceutical Compositions

| Formulation A - Sprayable Gel | |
|---|---|
| 92.64% | Deionised Water |
| 0.75% | Hyaluronic Acid (Sodium Hyaluronate) 1 × 10$^6$ Da |
| 0.10% | Tween 20 (Polyoxyethylene-20-sorbitan Monolaurate) |
| 1.00% | Glycerin 99.5% |
| 0.01% | Lavender Essential Oil |
| 0.50% | 25 Euxyl PE 9010 (Phenoxyethanol (and) Ethylhexylglycerin) |
| 5.00% | RM191A (mixture of copper ion complexes) |
| 100.00% | |

Amounts referred to are % w/w based on the total weight of the composition.

"RM191A" has a solids content of approximately 42%.

"RM191A" is a mixture of copper ion complexes obtained by a process similar to that described in Examples 1 and 2.

Method
1. Add the hyaluronic acid (sodium hyaluronate, average MW of 1×10$^6$ Da), Glycerin and Euxyl PE 9010 to the water and blend until the hyaluronic acid is dissolved.
2. Allow to stand (covered) overnight to deaerate.
3. Pre-mix the Tween 20 and Lavender Oil until homogeneous then add to the H$_2$O/hyaluronic acid.
4. Mix until completely dispersed.
5. Add the RM191A and mix for 5 minutes.
6. Yields a clear blue/green gel.

Formulations B to F below were prepared by similar methods.

| Formulation B - Mouthwash | |
|---|---|
| 85.00% | Deionised Water |
| 0.50% | Hyaluronic Acid (Sodium Hyaluronate) $1 \times 10^6$ Da |
| 10.00% | Glycerin 99.5% |
| 0.50% | Euxyl PE 9010 |
| 0.50% | Tween 80 |
| 0.50% | Peppermint Oil |
| 3.00% | RM191A |
| 100.00% | |

| Formulation C - Gel Spray | |
|---|---|
| 92.45% | Deinoised Water |
| 0.75% | Hyaluronic Acid (Sodium Hyaluronate) $1 \times 10^6$ Da |
| 0.75% | Glycerin 99.5% |
| 0.50% | Euxyl PE 9010 |
| 0.50% | Tween 20 |
| 0.05% | Lavender Essential Oil |
| 5.00% | RM191A |
| 100.00% | |

| Formulation D - Nasal Spray | |
|---|---|
| 96.65% | Deinoised Water |
| 0.25% | Hyaluronic Acid (Sodium Hyaluronate) $1 \times 10^6$ Da |
| 0.20% | Glycerin 99.5% |
| 0.20% | Euxyl PE 9010 |
| 0.20% | Tween 20 |
| 2.50% | RM191A |
| 100.00% | |

| Formulation E - Pessary & Suppository | |
|---|---|
| 38.25% | Deinoised Water |
| 50.00% | Hyaluronic Acid (Sodium Hyaluronate) $1 \times 10^6$ Da |
| 5.00% | Glycerin 99.5% |
| 0.75% | Euxyl PE 9010 |
| 1.00% | Tween 20 |
| 5.00% | RM191A |
| 100.00% | |

| Formulation F - Cream | |
|---|---|
| 72.00% | Deionized Water |
| 0.20% | Carbopol Ultrez 21 |
| 1.00% | Hyaluronic Acid (Sodium Hyaluronate) $1 \times 10^6$ Da |
| 2.00% | Glycerin 99.5% |
| 0.50% | Triethanolamine 85% |
| 2.75% | Glyceryl Stearate & Cetearyl Alcohol & Sodium Stearoyl Lactylate |
| 6.00% | Jojoba Oil |
| 2.75% | Stearic Acid |
| 5.00% | Smoothex (GMS SE) |
| 2.20% | Polysorbate 20 |
| 0.50% | Euxyl PE 9010 |
| 5.00% | RM191A |
| 0.10% | Lavender Essential Oil |
| 100.00% | |

In Formulations B to F above, the amounts referred to are % w/w based on the total weight of the composition and "RM191A" has a solids content of approximately 42%.

Traditional gelling and rheology modifying systems were tested in place of the hyaluronic acid. Those tested include:

Carbomers—Carbopol (a range of high molecular weight, crosslinked polyacrylic acid polymers);

Microcrystalline cellulose (MCC) and variations of MCC;

Natural gelling agents including aloe-vera, xanthan gum, agar agar, sodium alginate, carrageenan, various fumed silica products, diatomaceous earth;

Micro-fibrillated cellulose.

Compared to these systems, the composition comprising RM191A and hyaluronic acid provided advantageous properties such as improved bioavailability/bioactivity of the RM191A complex. The bioactive copper ion complexes in topical formulations comprising hyaluronic acid were also observed to have long-term stability. Such advantages were surprising and completely unexpected.

None of the gelling/rheology modifying systems listed above were found to enhance the bioavailability/bioactivity of the RM191A complex like hyaluronic acid did. The dual action of the hyaluronic acid (i.e. gelling and improvement of the bioactive properties of RM191A) was completely unexpected.

Example 5

Examples of Formulations in the Treatment of Pain

| SUBJECT | AGE/GENDER | CONDITION | SYMPTOMS | TREATMENT | OUTCOME |
|---|---|---|---|---|---|
| 1 | 65/M | Partial tear of Right anterior crucian ligament | Significant localized, deep pain, swelling and inability to walk or sleep | Gel formulation C. Comparative cream* and pure RM191A were administered before gel formulation, neither of which were as effective as the gel formulation | The pain resolved almost immediately and did not return overnight. Over the following 48 hours the swelling also resolved. |
| 2 | 29/M | Toothache in left upper jaw in advance of diagnosed need for a root canal | Extreme pain, inability to sleep, chew, manage hot or cold food/drink | Gel formulation C applied to the exterior cheek area adjacent to painful tooth. Comparative cream* and paracetamol administered 2.5 hrs before gel. Neither the Comparative cream* nor paracetamol were as effective as the gel formulation | The pain resolved almost immediately and did not return overnight. Pain returned about 12 hours after initial application and was alleviated following further topical application of gel formulation. |

| SUBJECT | AGE/ GENDER | CONDITION | SYMPTOMS | TREATMENT | OUTCOME |
|---|---|---|---|---|---|
| 3 | 55/F | Toothache in upper L middle front tooth | Extreme pain, resulting from previous physical trauma to face. | Gel formulation C applied to the exterior lip area above and adjacent to painful front teeth. Comparative cream*, paracetamol and panadeine forte administered before the gel formulation, none of which were as effective as the gel formulation | Pain resolved completely within 30 min and did not return following treatment with Gel formulation. 24 hours later following a single gel treatment, dentist examination including X-Ray found that the three teeth adjacent to the treated lip area were unaffected by "mechanical tap" and cold, whilst adjacent teeth responded normally. This situation lasted a further 12 hours then reverted to normal sensitivity. |
| 4 | 70/F | R Toe base, across metatarsal bone area with shooting pain (8 on a 10 scale) Sporadic condition experienced for last 2 years. | Extreme pain, no evident cause. Sporadic | Gel formulation C applied to foot and toe. Previously all NSAIDs (tablets or topical) or topical cooling gels not effective for pain. Comparative cream* and aqueous RM191A (in the form of a spray) were administered before gel formulation applied, neither of which were as effective as the gel formulation. | The Gel formulation was applied and pain was gone within minutes. Tried walking to revive symptoms but pain was gone and did not return over the following 10 day period. |
| 5 | 17/M | Baseball pitch hit inside right knee, visible mark of impact | Severe pain, beginning of significant bruise (also a hemophiliac, prophylaxsis ev 48 hr) | Gel formulation C initially applied within 5 min and then once again during game | Immediately the pain was resolved and did not return. By the end of the game the site of the trauma was showing only a very thin ring of slightly red skin at the margins of where the baseball hit. With further treatment before bed, by the morning the trauma injury was not visually detectable. |
| 6 | 6/F | Fell off playground equipment onto a metal bar causing severe hematoma on inside left thigh | Severe pain, very significant bruise/ hematoma. Difficulty walking and constant pain | Gel formulation C applied 48 hours post injury. Comparative cream* applied on first day but was not as effective as the gel formulation. | Immediately the pain was resolved and did not return. With 2 application for each of the next 4 days, hematoma resolved almost completely, but pain did not return. |
| 7 | 62/M | Peripheral neuropathy and Hand and Foot syndrome resulting from chemotherapy | Severe neuropathic pain on hands and feet | Gel formulation C applied to hands and feet. Previous use of Comparative cream* was less effective, delivering slower pain relief onset, less analgesia and shorter-term of relief. | The burning, sharp pain resulting from hyperalgesia resolved almost immediately. Pain remained resolved for approximately 8 hours before re-application of the Gel formulation. Gel formulation subsequently applied at 8 hour intervals. |
| 8 | 35/F | Chronic, severe lower back pain resulting from multiple car accidents | Extreme lower back pain and stiffness, particularly in the morning | Gel formulation C applied to lower back. Comparative cream* administered before gel formulation applied. Comparative cream* was not as effective as the gel formulation. | Within minutes of applying the Gel formulation, immediate pain relief was experienced. The Gel formulation provided overnight analgesia and in the morning no pain was evident, nor was the usual stiffness. |
| 9 | 70/F | Chronic R knee pain and swelling. Diagnosed as no cartilage remaining in joint. | Pain in knee, near side of patella. Resting or walking. Extreme swelling. | Gel formulation C applied to knee in afternoon. Repeated before bed. Previous use of NSAIDs or other medication provided no pain relief. Comparative cream* (administered before gel formulation applied) was not as effective as the gel formulation. | Complete pain relief within minutes (5-10 min). Mobility relief included. After sleep, all visible swelling was gone. Awoke with no pain evident. |

*The "Comparative Cream" referred to in the above table is similar to Cream formulation E described in Example 4, but does not contain hyaluronic acid.

The results summarised in Example 5 demonstrate the usefulness of the formulations described in Example 4 in the treatment of various types of pain. Furthermore, these results demonstrate the improved activity of compositions/formulations of the present invention compared to formulations that do not comprise hyaluronic acid.

Example 6

RM191A Effect on Opioid Treatment

It is established that chronic opioid treatment can result in increased levels of pro-inflammatory cytokines and chemokines, including IL-1β, IL-6, and TNF-α, and the chemokines CCL2 (MCP-1), CXCL12 and CX3CL1 which have all been shown to counteract opioid induced analgesia in both chronic and acute pain conditions (see, Melik, et al., 2015).

A particular focus of researchers over the past few years has been the role that IL-6, CCL2 and CXCL12 and their receptors play in the loss of opioid analgesia and the development of opioid tolerance. These three cytokines/chemokines have been directly implicated in the development and maintenance of opioid tolerance, with the researchers in each case postulating that modulation of the expression of these cytokines/chemokines, or interference in the signalling pathways that are associated with these ligands and their receptors may provide a "new therapy for morphine/opioid tolerance" (see, Melik et al., 2015; Lin et al., 2017; Eijkelkamp, 2017)

Researchers have more recently directly highlighted CXCL12/CXCR4 signalling as both a primary cause of diminished opioid-analgesia and the development of opioid tolerance. In 2015, researchers proposed mechanisms for the development of both acute and chronic opioid tolerance that directly implicate CXCL12-CXCR4 signalling pathways, describing mechanisms of cross-talk between opioid receptors and chemokine receptors, (see, Parsadaniantz et al., 2015).

Parasadaniantz concluded that acute CXCL12 release can produce desensitization of opioid receptors through SKF activation and result in loss of analgesia and development of acute opioid tolerance. They further established that CXCR4 expression is increased by chronic morphine administration which through induction of extracellular signal-regulated kinase (ERK) activation, results in morphine-induced hyperalgesia. (see, Melik et al., 2015).

Results

As clearly demonstrated by FIG. 1, the cytokines CXCL12, CCL2 and IL-6 were all significantly reduced in subjects that were treated with the RM191A composition. Specifically, it is shown that IL-6 expression is down-regulated by 19-fold; CCL2 by 30-fold, and CXCL12 by 600-fold.

From this data (and together with the data described in Examples 1-5), the present inventor realised that the Cu ion compositions of the present invention also find utility not just in primary pain relief, but also in a pain management regime as an adjuvant therapy with opioids, it may restore the effectiveness of opioids in clinical pain management and prevent both opioid tolerance and opioid-induced hyperalgesia. Longer-term, and following stabilized pain results, patients may then transition to use of RM191A preparations as primary pain relief therapies.

Without being restricted to any particular mechanism of action, the inventors postulate that RM191A significantly down-regulates CXCL12, effectively blocking signalling to the CXCR4 receptor, and thereby restoring opioid receptor sensitisation in acute tolerance. This lowers the risk of opioid-induced hyeralgesia in chronic tolerance.

Materials and Methods

A cream formulation containing 2.2% RM191A, was applied at about 10 mg/cm². Analytical work on RM191A has been carried out at both the Faculty of Biomedical Sciences at Macquarie University, as well as at the Department of Chemistry at the University of New South Wales. Biological work has been conducted at the Faculties of Medicine at both the University of New South Wales and Macquarie University.

Using PCR array methods, we have found that RM191A can significantly modulate some of the major inflammatory cytokines and chemokines, in vitro.

Cytokine/Chemokine Analysis

Sample preparation performed at Macquarie University Faculty of Medicine and Health.

Cytokine analysis performed by EVE Technologies (Canada) using a Human Cytokine 65-Plex Discovery Assay.

Sample Preparation Method
Cells are Primary Human Fibroblasts;
Seeding density of 130,000 cells/well;
RM191A concentration at 0.5 mg/ml;
All cells were washed three times with PBS before addition of media or media with RM191A.
Preparation involved:
Thawing of cells;
Culturing of cells;
Freezing of stock;
Seeding of cells (24 hrs);
Treatment of cells;
mRNA harvest and extraction (24 hrs);
Reverse transcription;
Freezing samples and shipping to EVE Technologies Canada for Cytokine Analysis.

The invention claimed is:
1. A composition comprising:
  (i) high molecular weight hyaluronic acid, a salt of a hyaluronic acid or a mixture thereof wherein the molecular weight of more than 50 w/w % of the hyaluronic acid is in the range from about $10^6$ to about $10^7$ Da; and
  (ii) a copper ion complex or a mixture of copper ion complexes obtained by a process comprising:
    (a) contacting copper having a specific surface area of from about 0.1 m²/kg to about 2 m²/kg, or in the form of particles having a bulk density of between about 0.2 and about 8.0 g/cm³, with a chelating agent in solid form; and
    (b) while the copper is in contact with the chelating agent, contacting the copper and chelating agent with an oxidising agent, to form the copper ion complex or mixture of copper ion complexes.
2. The composition according to claim 1, wherein the chelating agent is ethylenediaminetetraacetic acid (EDTA), a salt of EDTA or a mixture thereof.
3. The composition according to claim 1, wherein the process further comprises a step (c) of allowing the combination of agents resulting from step (b) to react until completion.
4. The composition according to claim 1, wherein the copper ion complex comprises-coordinated to a ligand of Formula (I) or Formula (II) or Formula (VI)

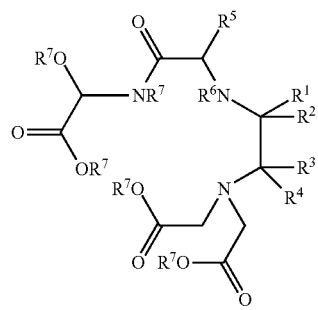

Formula (I)

Formula (II)

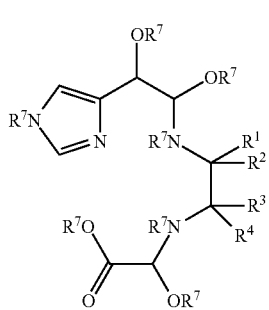

Formula (VI)

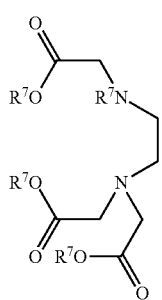

wherein
$R^1$ is H and $R^2$ is H or OH, or $R^1$ and $R^2$ together with the carbon atom to which they are attached form a carbonyl (C=O);
$R^3$ is H and $R^4$ is H or OH, or $R^3$ and $R^4$ together with the carbon atom to which they are attached form a carbonyl (C=O);
$R^5$ is —CH(OR$^7$)CH$_2$OR$^7$ or —CH$_2$CO$_2$R$^7$ and $R^6$ is absent or H, or $R^5$ is H and $R^6$ is —CH(OR$^7$)CH$_2$OR$^7$ or —CH$_2$CO$_2$R$^7$; and
each $R^7$ is independently absent or H;
or a salt thereof, tautomer thereof or polymer thereof.

5. A method of treating or preventing pain in a subject, the method comprising administering a composition according to claim 1 to the subject, wherein the pain is pain associated with endometriosis.

6. The composition according to claim 1, further comprising an opioid.

7. The composition according to claim 6, wherein the amount of opioid in the composition is less than a therapeutically effective dose of the opioid alone.

8. The composition according to claim 6, wherein the opioid is selected from the group consisting of: morphine, heroin, etorphine, hydromorphone, oxymorphone, levorphanol, codeine, hydrocodone, oxycodone, nalmefene, nalorphine, naloxone, naltrexone, buprenorphine, butorphanol, nalbuphine, methylnaltrexone, fentanyl, and methadone.

* * * * *